(12) United States Patent
Sri-Jayantha et al.

(10) Patent No.: US 6,532,129 B1
(45) Date of Patent: Mar. 11, 2003

(54) METHOD AND APPARATUS FOR SUSTAINING FEEDBACK FILTER STATE HAVING PERIODIC OUTPUT

(75) Inventors: Sri Muthuthamby Sri-Jayantha, Ossining, NY (US); Hien P. Dang, Nanuet, NY (US); Arun Sharma, New Rochelle, NY (US); Isao Yoneda, Yokohama (JP); Nobuyuki Kitazaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/330,180

(22) Filed: Jun. 11, 1999

(51) Int. Cl.⁷ .............................................. G11B 5/596
(52) U.S. Cl. ................................................. 360/77.02
(58) Field of Search ........................ 360/25, 31, 77.04, 360/75, 77.02

(56) References Cited

U.S. PATENT DOCUMENTS

| | | | | |
|---|---|---|---|---|
| 5,301,072 A | * | 4/1994 | Wilson | 360/77.01 |
| 5,444,583 A | * | 8/1995 | Ehrlich et al. | 360/78.09 |
| 5,608,586 A | * | 3/1997 | Sri-Jayantha et al. | 360/77.04 |

* cited by examiner

*Primary Examiner*—David Hudspeth
*Assistant Examiner*—Mitchell Slavitt
(74) *Attorney, Agent, or Firm*—McGinn & Gibb, PLLC

(57) ABSTRACT

A disk drive system, includes a head, a controller for controlling an operation of the head, at least one feedback filter coupled in relation to the controller, and a mechanism for keeping a function of the at least one of the feedback filter active during any of an absence of a valid position error signal (PES) and a position error signal being unavailable due to a defect during an operation of the head.

34 Claims, 17 Drawing Sheets

METHOD AND APPARATUS FOR SUSTAINING FEEDBACK FILTER STATE HAVING PERIODIC OUTPUT

BACKGROUND OF THE INVENTION

1. Field of the Invention

The present invention generally relates to a disk drive, and more particularly to a disk drive including a mechanism for sustaining a feedback filter state having a periodic output.

2. Description of the Related Art

At high track density (e.g., currently 15,000 tracks per inch (TPI), but expected to grow to 25,000 TPI by year 2000) track-following mode, a disk drive is ultra-sensitive to disturbance sources acting on it. Some disturbance sources may contain components at unique frequencies dictated by the physical processes associated with them. Among the sources, vibration and disk flutter are two major processes that contribute to high track density limitation.

A disk drive with a sector servo architecture requires a fine position error signal (PES) in track-following mode for accurate positioning of the head. The fine PES is capable of representing the relative head-to-track motion as a percentage of track pitch with better than 8% (3-sigma) error. During a seek, only the Gray code that represents the track number is mandatory. The fine PES captures the relative motion between a track and a head not accurately measured at high seek velocity.

Hence, during a seek, a reliable fine PES is not available, and the actuator control current is two orders of magnitude higher. Moreover, all components of the track-following servo algorithm are disconnected and deactivated during a seek. It has been demonstrated that, by employing a gain enhancing digital filter tuned to a given disturbance frequency, the track-following error of a disk drive can be reduced.

According to a conventional system and method, the digital filter state must be determined (stored) first, and then the initial condition of the filter must be set accordingly while connecting the filter during a track-following mode. Thus, the settle-out time penalty that would normally occur due to the "learning" time required for a feedback filter is minimized. When a single filter is employed against a disk-shift problem or "spindle-induced vibration", the conventional method works effectively.

However, when multiple filters are used to compensate for multiple frequency-based disturbance sources, the conventional method becomes limited in three areas as follows.

That is, the memory required to store the respective filter states increases proportionally to the number of filters used. Further, when the disturbance process is unsteady or not coupled to the spindle rotational position of the drive of interest, the phase drift encountered by a filter state may render the "stored" filter state inaccurate for filter initialization, thereby requiring a frequent filter state updating process. Additionally, when the frequency of the disturbance is not an exact an integer multiple (or at least substantially close to an integer multiple, such as by about 1–4% depending on the number of disk revolutions) of the spindle fundamental frequency, the addressing scheme required to extract the initial condition at the end of a seek becomes complex.

Therefore, the conventional systems and methods require large memory, complex addressing, and frequent initial condition updates.

Another problem of the conventional system is disk warpage (e.g., waviness) which causes the initial condition of the filter state not to be reliable/accurate. That is, an error component generated due to disk warpage (e.g., caused by clamping of the disk or the like) may differ dependent upon the radial position of the disk. The conventional systems and methods cannot compensate for such a problem.

SUMMARY OF THE INVENTION

In view of the foregoing and other problems of the conventional methods and structures, an object of the present invention is to provide a method and structure in which memory requirements are minimized, addressing requirements are simple, and frequent initial condition updating are avoided.

According to a first aspect of the invention, a disk drive system includes a head, a controller for controlling an operation of the head, at least one feedback filter coupled in relation to the controller, and a mechanism for keeping a function of the at least one feedback filter active during any of an absence of a valid position error signal (PES) and a position error signal being unavailable due to a defect during an operation of the head.

The unique and unobvious structure and method of the present invention solves the problem of sustaining the track-following feedback filter state in the absence of an accurate fine position error signal (PES) encountered during a seek (or unavailability of the PES due to a defect such as a magnetic defect) so that a special filter initialization process is eliminated. By keeping the feedback filter functions active during the absence of a fine PES, as is the case during a seek, the invention eliminates the use of stored filter state required for each filter employed.

The present invention provides novel approaches to solve the problem of feedback filter utilization when seek and track-following operations are repeatedly executed.

Several methods have been tested on experimental hardware and shown to effective and to provide superior results. A first method simply allows the feedback filter(s) to continue to coast along as if the filters(s) are still in the track-following mode by providing a Null-PES input during a seek. The state of the same filter continues to evolve based on the initial state value left over just prior to a seek. At the end of a seek, the Null-PES input is replaced by the newly measured PES stream.

An enhancement to the first approach is to replace the nominal feedback-filter coefficients by a filter with identical peak-frequency, but with zero damping so that the state evolution is sustained without any dissipation of the filter sinusoidal amplitude while preserving the amplitude during the seek mode.

A second method of the present invention employs a dedicated PES memory buffer, from which a pseudo-PES stream is extracted and input to the filter that would sustain the filter state during a seek. At the end of a seek, the filter input is replaced by the newly measured PES stream. The PES-buffer is persistently upgraded while in a track-follow mode by the most recent PES stream, as indexed by the sector number regardless of the track number. With the second method, the most recent disturbance characteristics are retained in the PES-buffer.

When the frequency of disturbance is an integer multiple (or substantially close thereto) of the rotating speed of the spindle of the product of interest, the length of the PES buffer is exactly equal to the total number of servo sectors in a track. However, if the disturbance frequency is lower than that of the spindle speed, the PES-buffer length is extended to cover a complete cycle of the slowest frequency of interest. Individualized address pointers are allocated for each disturbance component that corresponds to a non-integer multiple of the spindle rotating speed. These address pointers are offset by a number that is computed to be a function of its period.

Depending on the nature of the disturbance, a combination of the first and second approaches can be optimally used.

Thus, the method and structure of the present invention minimizes memory requirements, uses simple addressing, and avoids frequent initial condition updates.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
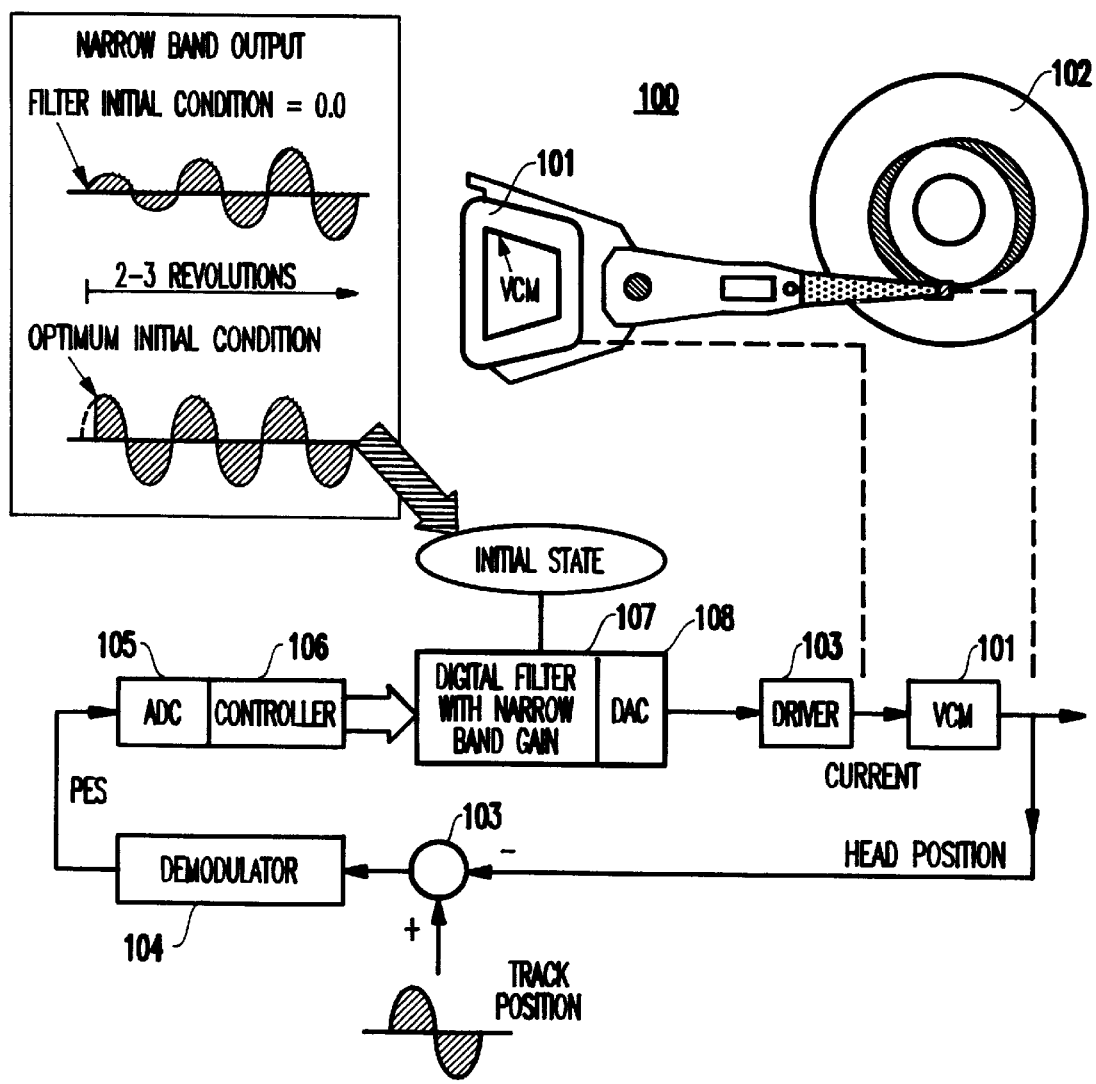
FIG. 1 illustrates a periodic filter in a feedback loop according to a conventional system.

Referring now to the drawings, and more particularly to FIGS. 1–17(d), there are shown preferred embodiments of the method and structures according to the present invention.

FIGS. 1–4 illustrate a conventional system and method.

FIG. 1 shows a system 100 including a voice coil motor (VCM) 101 for reading from/writing to a disk 102.

As shown, the feedback loop includes a driver 103 for driving the VCM 101. The head position of the VCM 101 is controlled by the feedback loop including a summing circuit 103 receiving a track position signal, a demodulator 104 for producing a position error signal (PES), an analog-to-digital converter 105 for converting the analog PES to a digital signal, a controller 106, a digital filter 107 (at least one filter, although a plurality of filters may be used depending on disk size, system characteristics, etc.) initially receiving a stored state of the filter, and a digital-to-analog converter 108 for providing the signal to the driver 103.

In the conventional method, the filter state is anticipated to be repeatable and stable so that the initial value needed to activate an optimum track-follow control is known a priori.

Therefore, during periods when a valid PES is not available for an extended time period (e.g., generally depending upon a seek length such as about 5 ms–20 ms or a portion thereof) when large VCM drive signals are generated, the filters are disconnected from the feedback loop temporarily, and then activated and connected to the control loop. "Control loop" is a generic term and includes all elements involved in achieving a control action, at the end of a seek with values of the state stored a priori. Feedback and feedforward are additional refinements to a generic control loop function.

Figure 2:
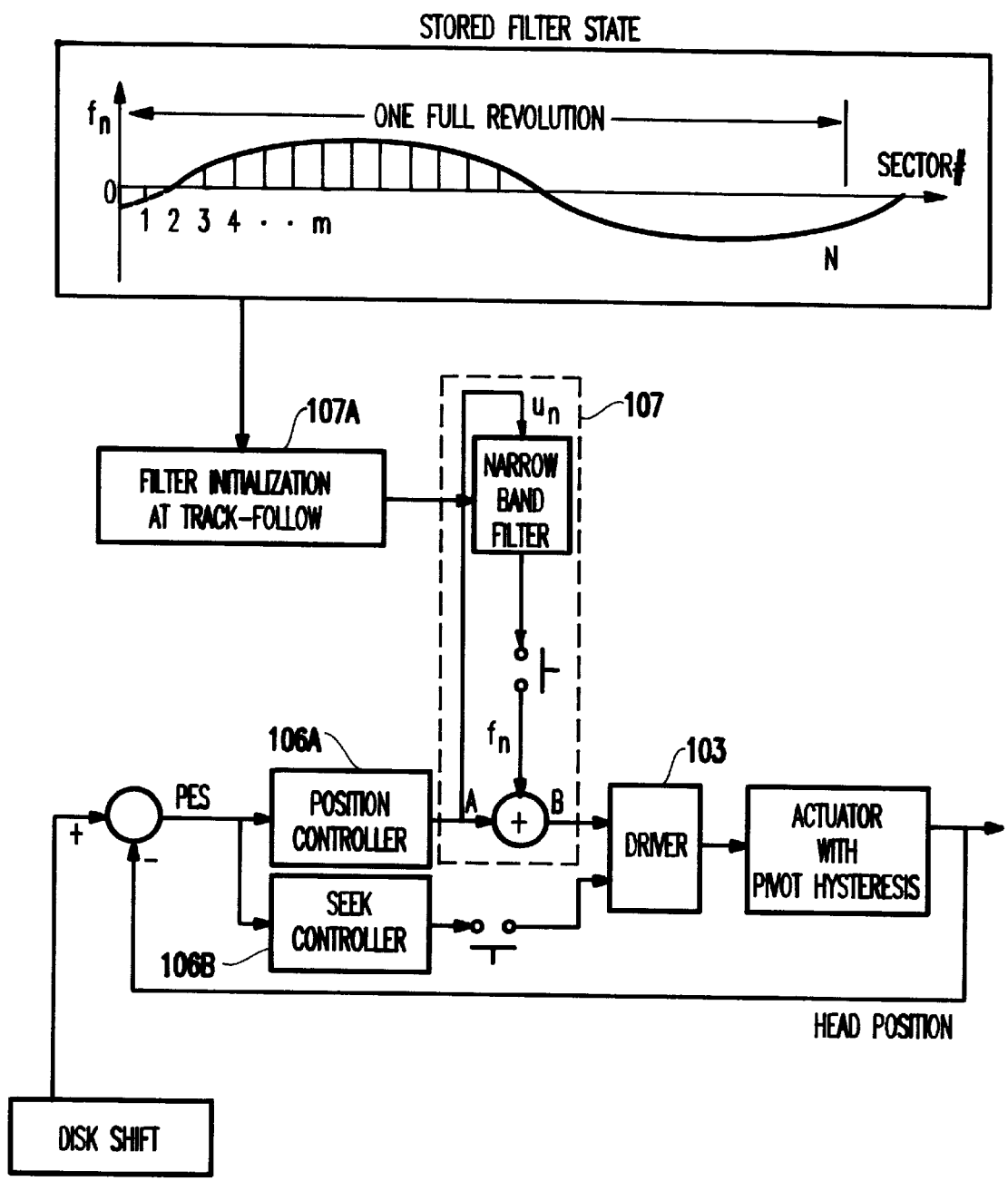
FIG. 2 illustrates details of a filter initialization according to the conventional system.

FIG. 2 illustrates the initialization of the filter with greater particularity from FIG. 1. In FIG. 2, the same reference numerals as FIG. 1 are used to illustrate the same elements. As shown, FIG. 2 includes narrow band filter 107 receiving stored filter data 107A (e.g., filter initialization data) during a track-follow operation. During settleout or track-follow mode, a position controller 106 receives the PES and provides the same to the filter and to the driver 103, respectively. The driver drives an actuator 101A of the voice coil motor 101. During seek, the seek controller receives the track number (Gray code) and performs a velocity control function without requiring the narrow band filter 107.

Figure 3A:
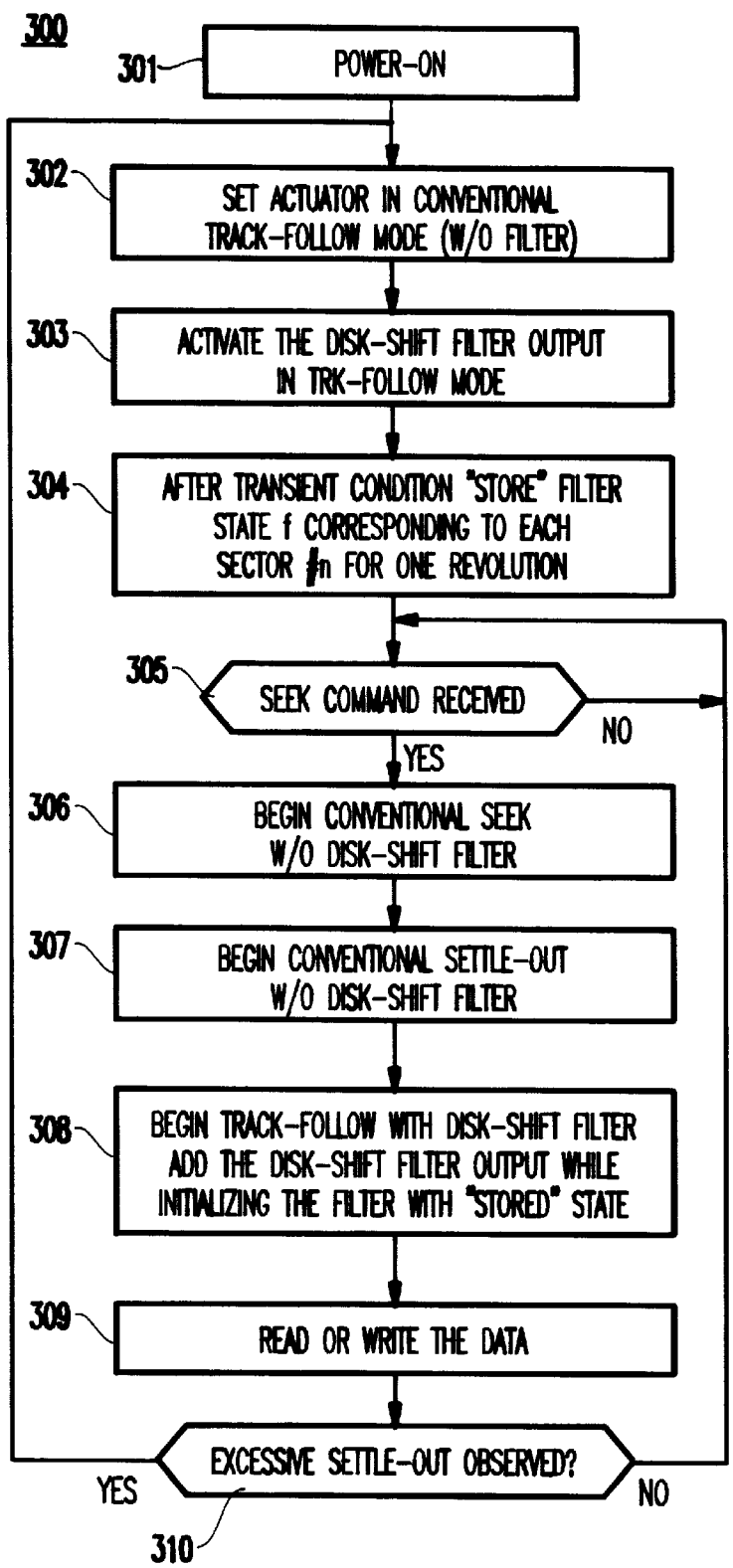
FIG. 3A illustrates a detailed flow chart of filter state estimation and initialization according to a conventional method.
Figure 3B:
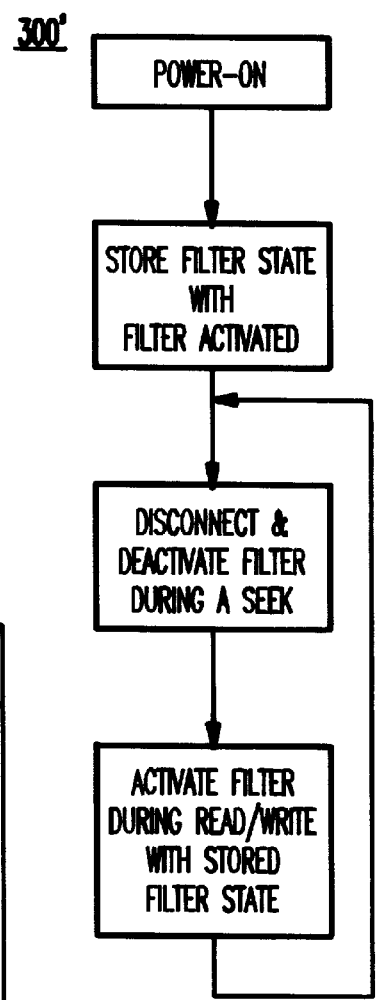
FIG. 3B illustrates a brief, simplified flow chart which corresponds to FIG. 3A and which illustrates filter state estimation and initialization according to the conventional method.

FIGS. 3(a) and 3(b) respectively show the phases of deploying the feedback filter in detail form 300 as well as in a simplified form 300'.

In the detailed flowchart of FIG. 3(a), after power-on in step 301, the actuator is set in a conventional track-follow mode (e.g., without the filter being activated) in step 302.

Thereafter in step 303, the disk-shift filter output is activated in track-follow mode, and in step 304 after the transient condition the filter state is stored corresponding to each sector number for one disk revolution. In step 305, it is determined whether the seek command has been received. If the seek command has not been received the process proceeds to step 310 described below. If the seek comment has been received, then in step 306 the conventional seek is begun without a disk-shift filter.

In step 307, the conventional settle-out is commenced without a disk shift filter, and in step 308 the track-follow is begun with disk-shift filter. The disk shift filter output is added while initializing the filter with a "stored" state.

In step 309, the data is read from or written to the disk. Finally, in step 310. It is determined whether excessive settle-out has been observed. If so, the process loops back to step 302. Otherwise, the process loops back to step 305.

In FIG. 3B, the simplified flowchart of the conventional method 300' illustrates that after power-on in step 301', the filter state is stored with the filter activated in step 302'. Thereafter, in step 303', the filter is disconnected and deactivated during a seek. Finally, in step 304', the filter is activated during a read/write with the stored filter state.

Figure 4A:
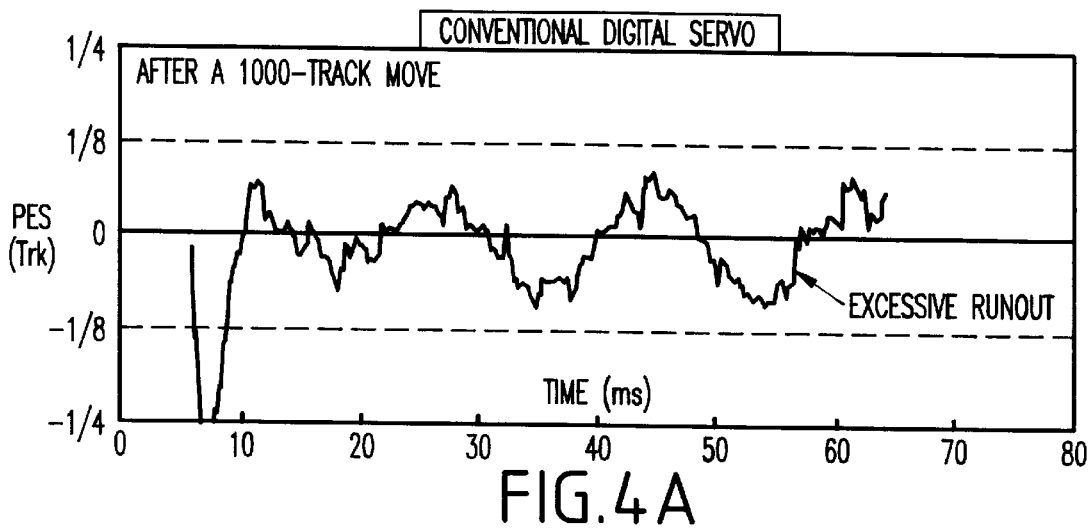
FIGS. 4(a)–4(c) illustrates experimental data showing optimum initialization of filter state according to the conventional system.
Figure 4B:
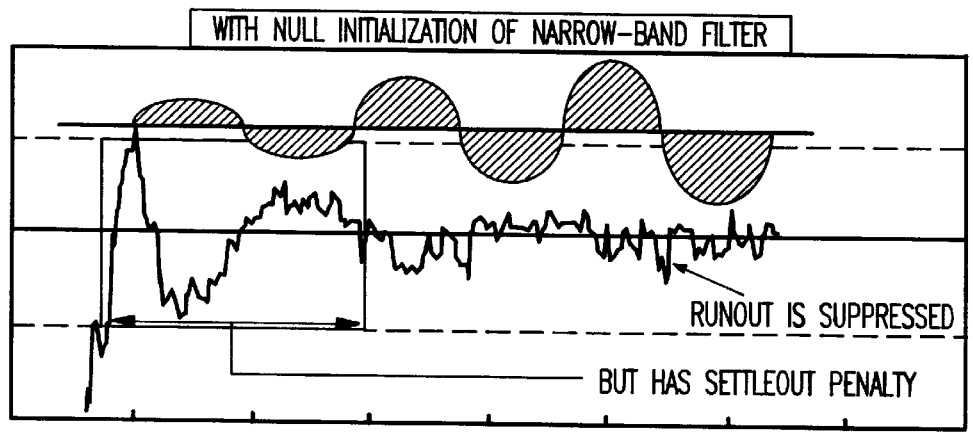
Figure 4C:
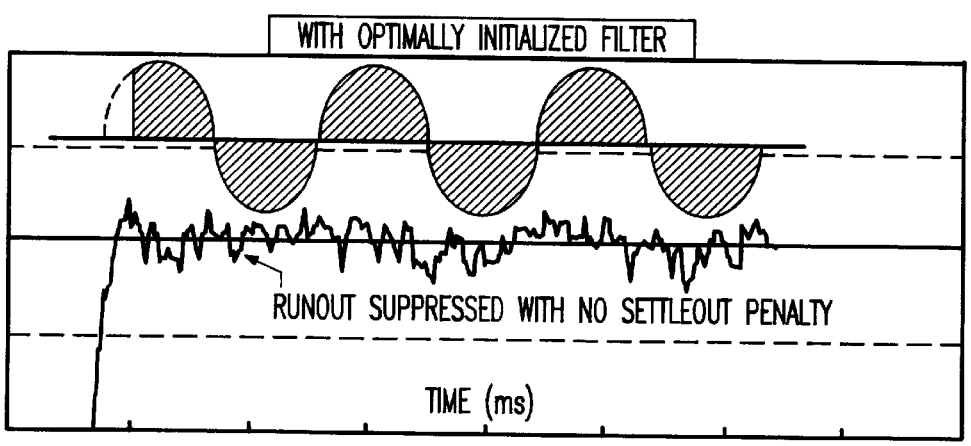

FIGS. 4(a)–4(c) show the importance of the filter initialization method on settle-out time penalty. Specifically, FIG. 4(a) shows the conventional digital servo after a 1000-track move, whereas FIG. 4(b) shows the digital servo with null initialization of the narrow-band filter. As shown, there is a settle-out penalty prior to run-out being suppressed. Finally, FIG. 4(c) illustrates the PES with an optimally initialized filter. As shown, run-out is suppressed without a settle-out penalty. Again, however, storing such optimal states of the filter requires much memory.

Thus, as described above, the conventional system has several drawbacks. That is, the storage space requirement is large, the filter state drift renders the state predictability less accurate, and complex address pointer generation is required when the frequency is not a multiple (or substantially multiple depending upon the number of disk revolutions) of the spindle frequency.

The Present Invention

Figure 5:
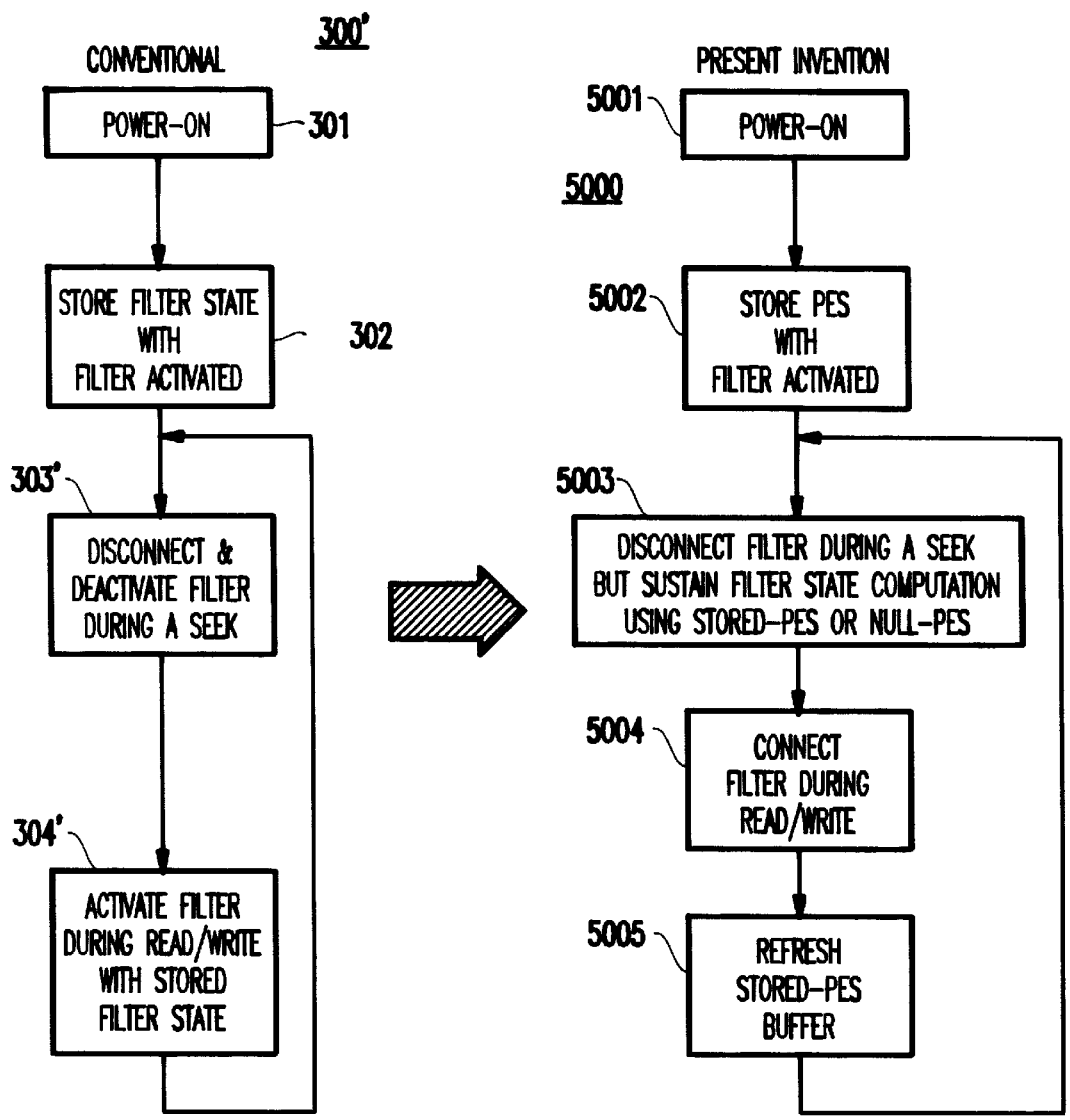
FIG. 5 illustrates a flow chart comparing the conventional system and the present invention.

FIG. 5 illustrates, in a flow chart form, some important aspects of the method 5000 of the present invention as compared to the conventional simplified method 300' shown in FIG. 3(b). FIG. 5 clearly shows the differences between the conventional approach and the inventive method.

As shown in FIG. 5 and as mentioned above in regard to FIG. 3(b), in the conventional simplified method, after power-on in step 301', in step 302' the filter state is stored with the filter activated. Then, in step 303', the filters are disconnected and deactivated during seek. Further, in step 304', the filter is activated during read/write with the stored filter state. Then, the process loops back to step 303'.

In contrast to the conventional method, in the present invention, after power-on in step 5001, in step 5002, the PES is stored with the filter activated. In step 5003, the filters are still disconnected but remain activated (i.e., computation process is continued) in the present invention. Thus, the filter state computation is sustained using a stored PES or Null PES signal. It is noted that, in step 5002, only the PES for a full period of a disturbance cycle is stored and the filter state history is not stored for the purpose of initialization. Thereafter, in step 5004, the filter is connected during a read/write operation, and in step 5005 the stored PES buffer is refreshed. Then, the process loops to step 5003.

Thus, a key difference between the invention and the conventional method is that the filters are disconnected and deactivated during seek in the conventional case, whereas in the present invention the filters are still disconnected, but the filter state computation process is continued. Additionally, only the PES for a full period of a disturbance cycle is stored. The filter state history is not stored for the purpose of initialization.

Figure 6:
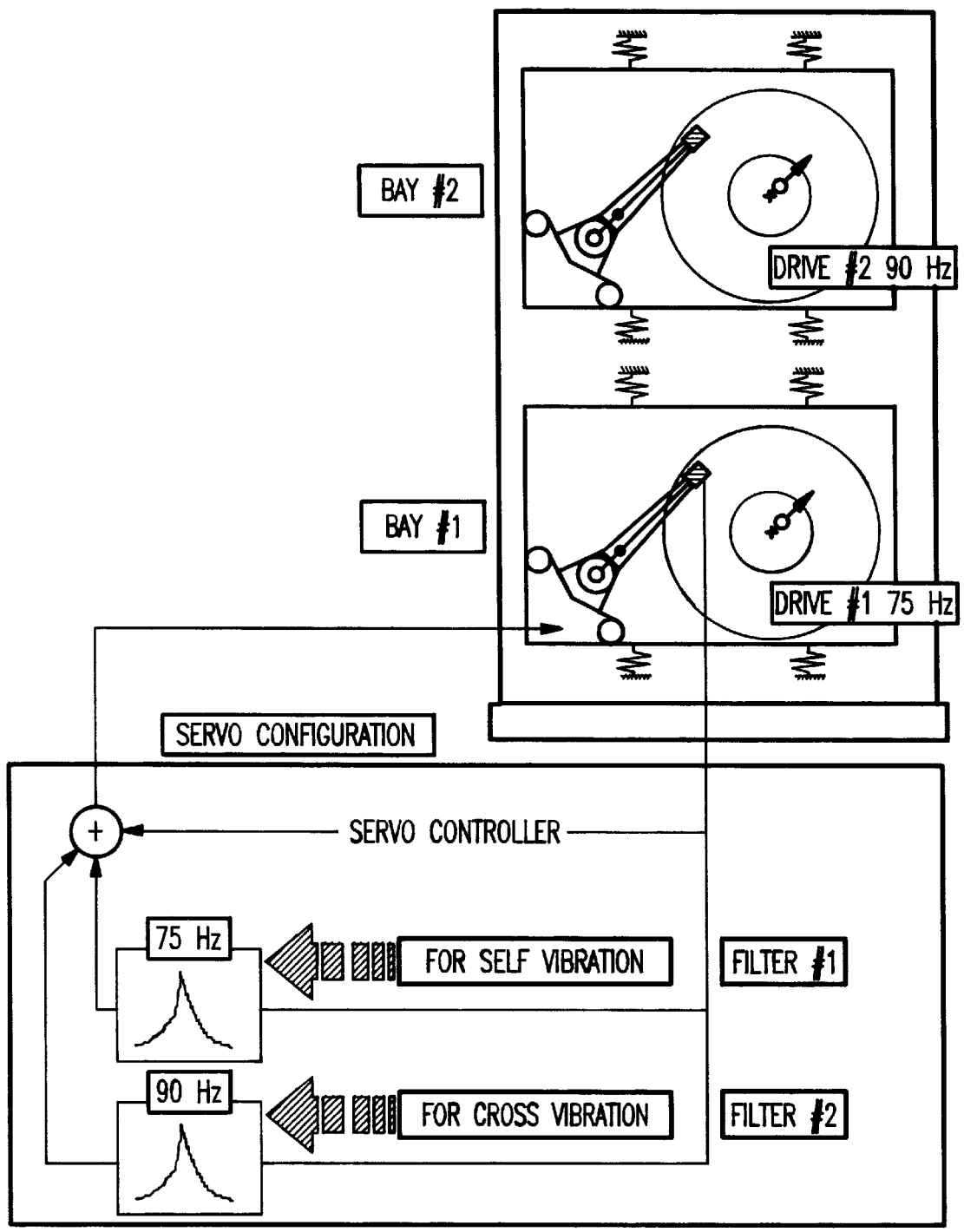
FIG. 6 illustrates an experimental setup used to demonstrate the method of sustaining the filter state according to the present invention.

FIG. 6 shows an experimental setup in which the present invention may be implemented.

A first drive (e.g., drive #1) that is of interest to the present invention is located in bay #1 of a computer chassis. This drive generates a first frequency (e.g., 75 Hz in an exemplary implementation) self-vibration component resulting from the spindle imbalance. In bay #2, a second drive (e.g., drive #2) generates a second frequency (e.g., 90 Hz) periodic vibration component that impacts the PES of drive #1. Generally, the problem of periodic disturbance is solved by employing high gain feedback filters configured at the frequency of disturbance. Thus, as shown in the lower portion of FIG. 6, first and second filters configured at the first and second frequencies (e.g, 75 Hz and 90 Hz) are provided.

Figure 7A:
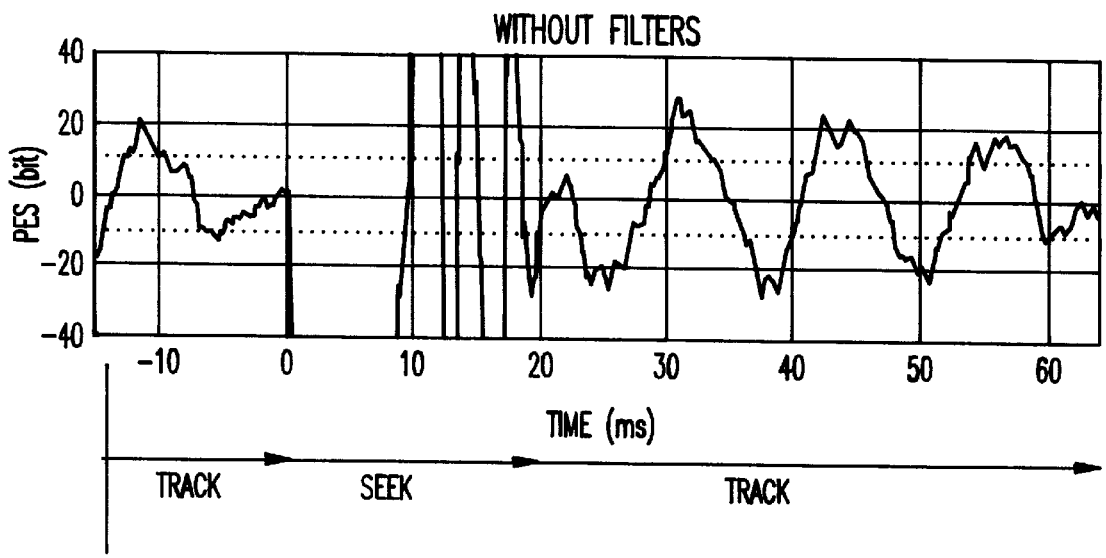
FIG. 7(a) illustrates an effect of self-vibration and cross-vibration on track-follow PES with no feedback filter.
Figure 7B:
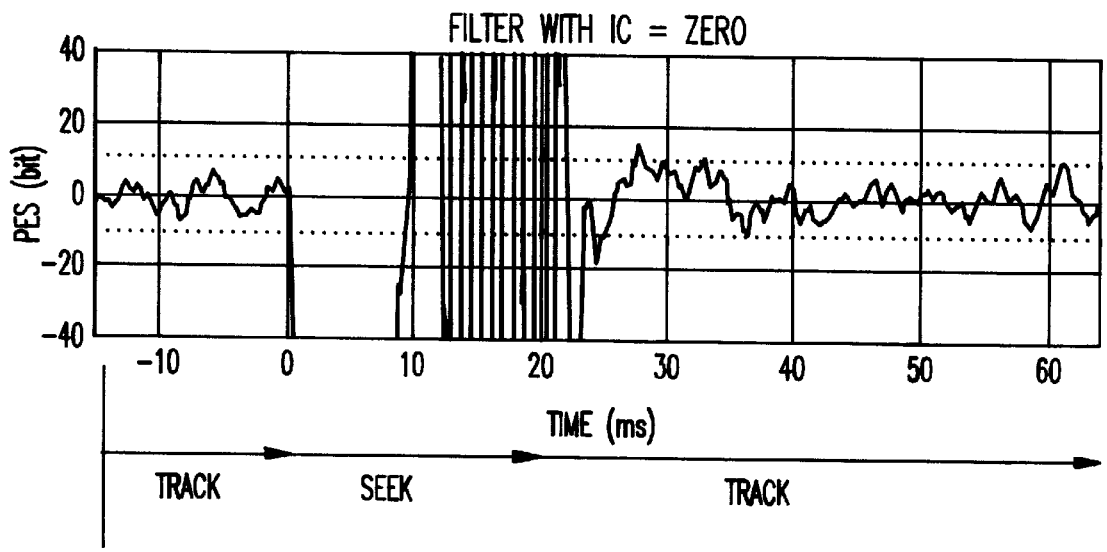
FIG. 7(b) illustrates that the positioning accuracy is enhanced using two filters tuned to vibration frequency.

FIGS. 7(a) and 7(b) respectively show comparative results without a feedback filter (e.g., no compensation) and with a feedback filter (e.g., filter with zero initial condition). That is, a PES as a function of time is shown for drives experiencing a track operation and a seek operation. As clearly shown in comparing the results of FIG. 7(a) with those of FIG. 7(b), multiple periodic disturbances can be solved by multiple high-gain feedback filters (e.g., configured at the frequency of disturbance).

Figure 8A:
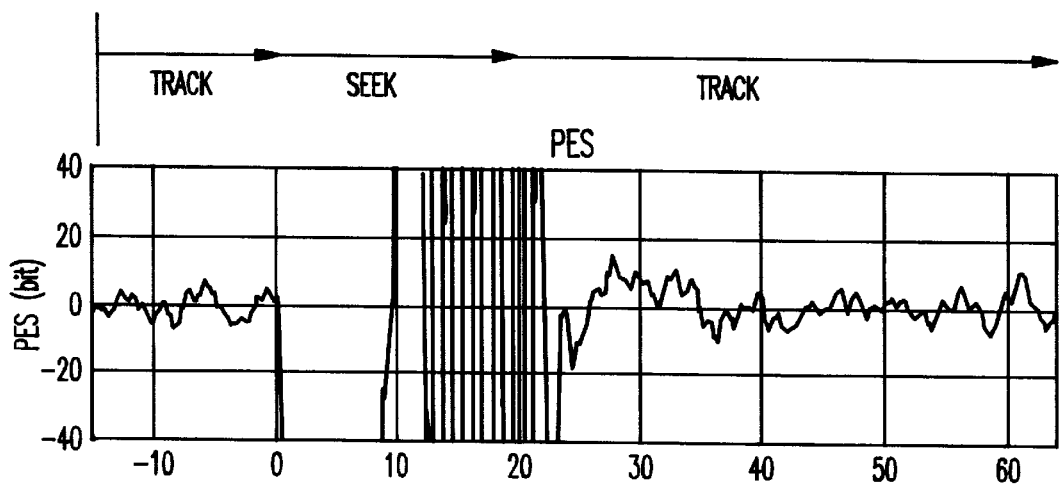
FIG. 8(a) illustrates a position error signal of FIG. 7(b) being repeated.
Figure 8B:
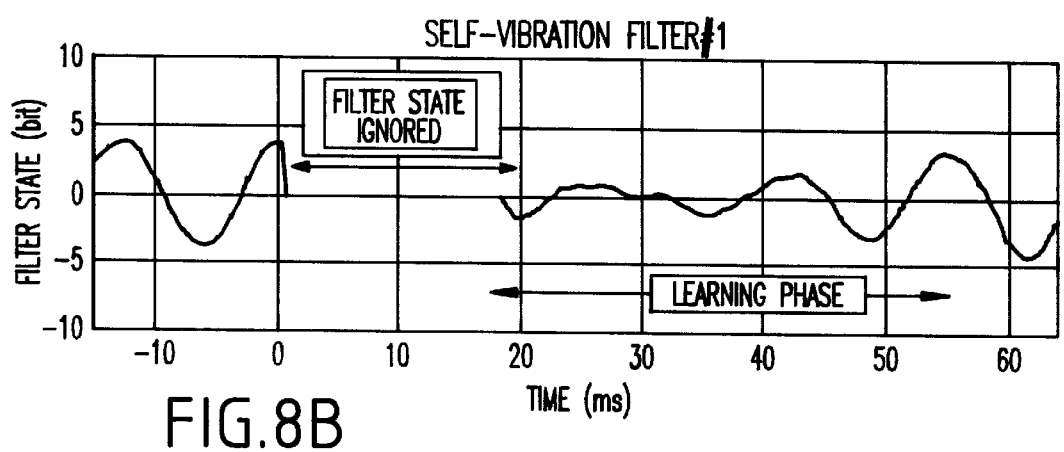
FIG. 8(b) illustrates a filter #1 state being initialized at zero subsequent to a seek.
Figure 8C:
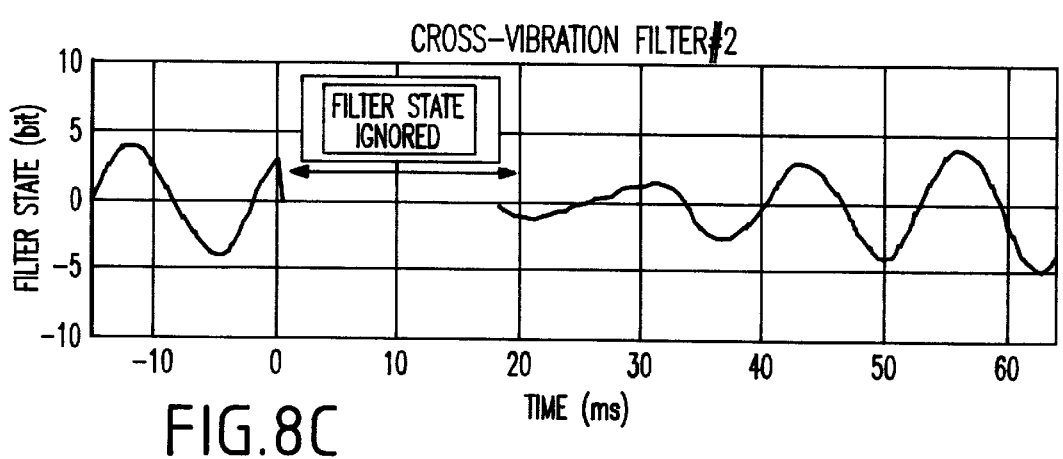
FIG. 8(c) illustrates a filter #2 state is initialized at zero subsequent to a seek.

FIGS. 8(a)–8(c) show the corresponding filter state evolution.

During a track-follow mode, the filter states are active and then the filters are disconnected from the feedback loop during a seek. As the drive access mechanism enters the track-follow mode subsequent to a seek, the filters in one configuration can be activated with a zero initial condition.

FIG. 8(a) illustrates the PES as a function of time over the track and seek operations. FIG. 8(b) illustrates a self-vibration filter #1 state over time including a period in which the filter state is ignored. FIG. 8(c) illustrates a cross-vibration filter #2 state over time with a filter state ignored during a seek.

As can be observed from FIGS. 8(a)–8(c), the filters need a "learning" (adaptive) phase in order to build up their state value to effectively cancel the disturbance component appearing in the PES.

Figure 9A:
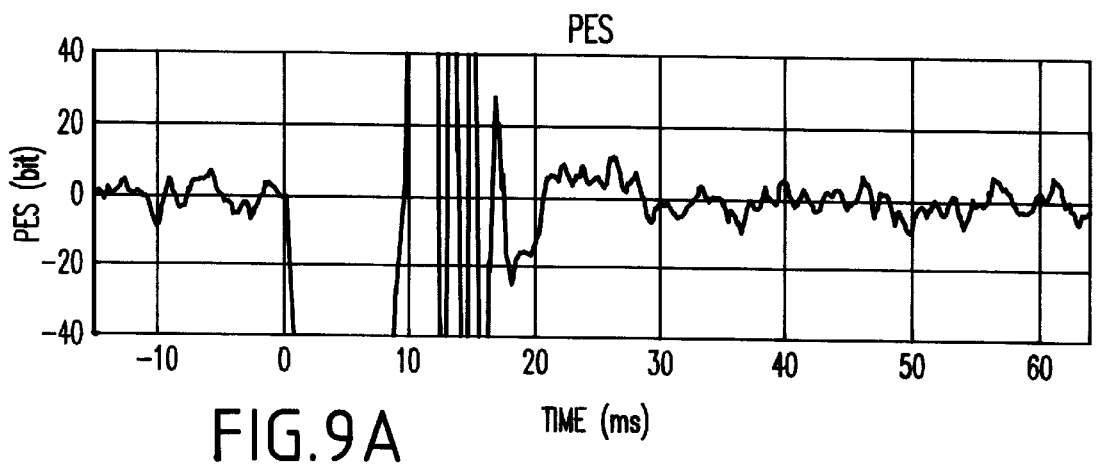
FIG. 9(a) illustrates a position error signal with stored filter state-based initialization.
Figure 9B:
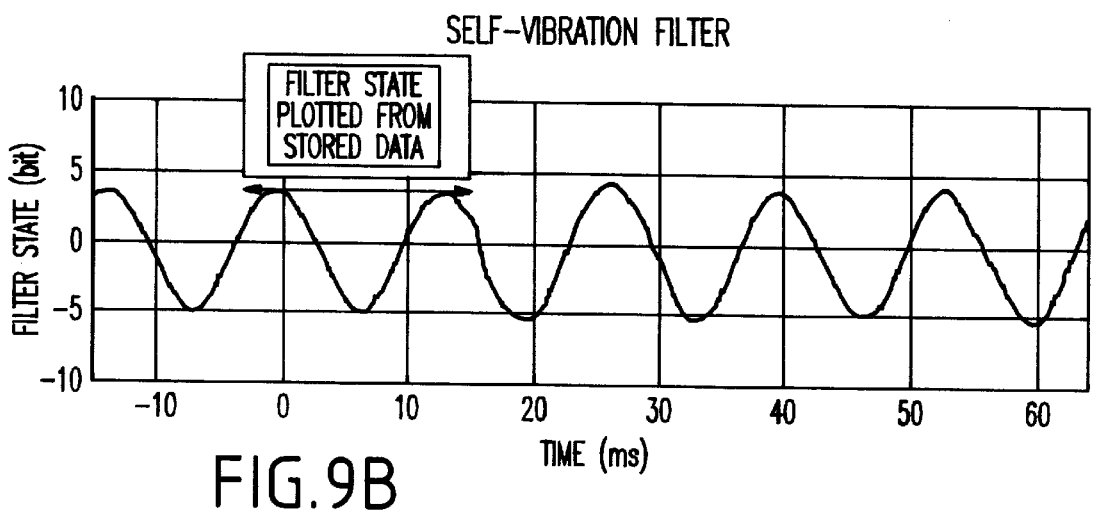
FIG. 9(b) illustrates a filter #1 state is constructed using stored state and optimally initialized at end of seek.
Figure 9C:
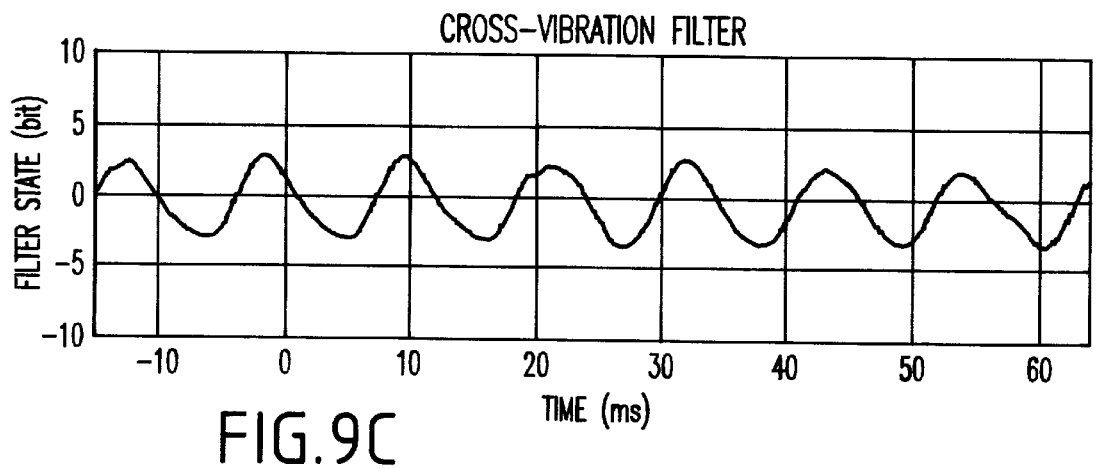
FIG. 9(c) illustrates filter #2 state is constructed using stored state and optimally initialized at end of seek.

FIGS. 9(a)–9(c) show the PES and filter state with the filters being initialized from a stored filter state. That is, FIG. 9(a) illustrates the PES as a function of time, whereas FIGS. 9(b) and 9(c) illustrate the states of the self-vibration filter and the cross-vibration filter, respectively, over time with a filter state plotted from stored data. As shown, using a stored filter state results in a smooth sinusoidal waveform for each of the filters. This feedback configuration has been covered by U.S. patent application Ser. No. 09/119,181 filed on Jul. 20, 1998, by Sri-Jayantha et al. and entitled "Adaptive Vibration Control for Servo Systems in Data Storage Devices", and incorporated herein by reference.

Figure 10:
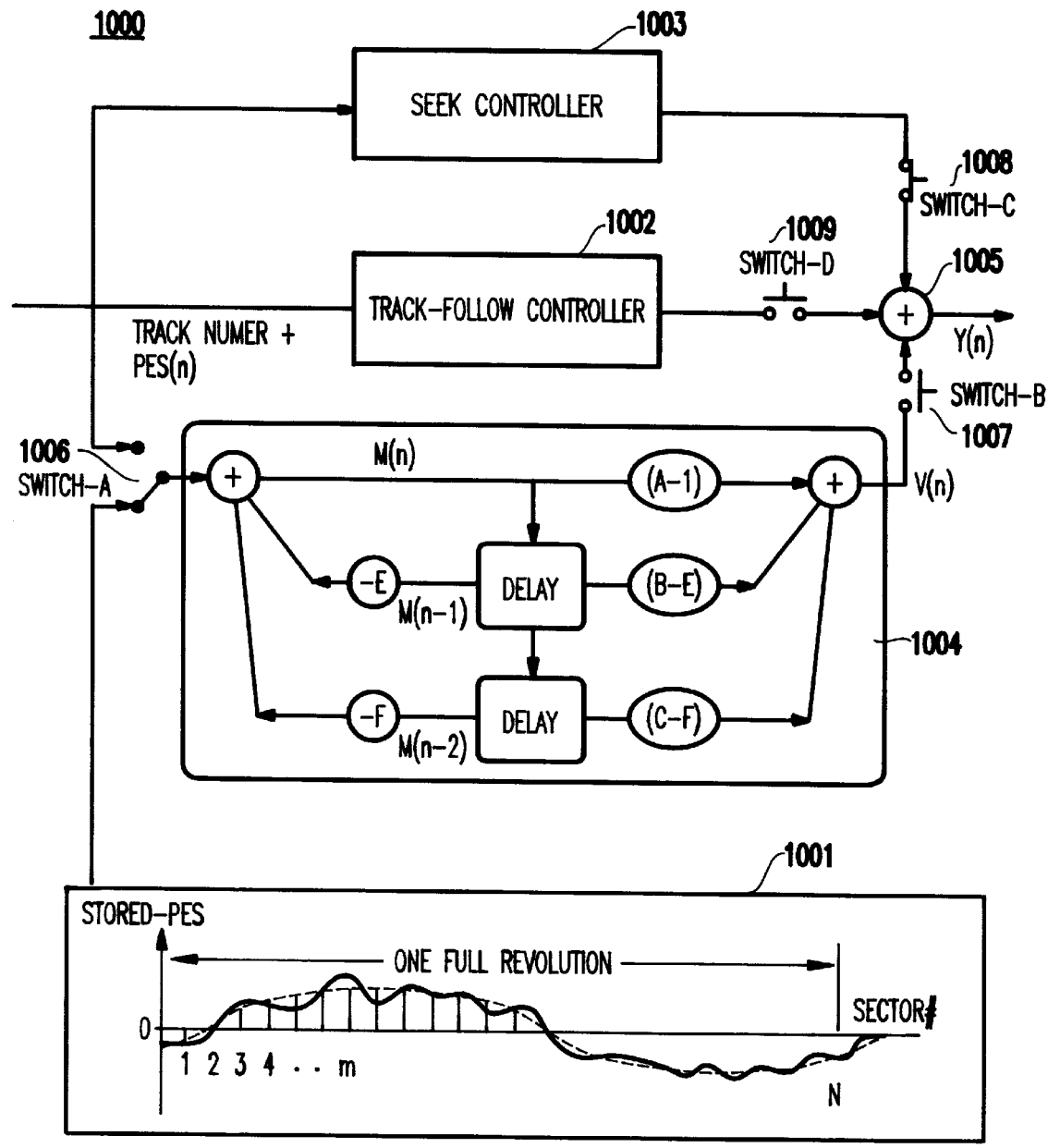
FIG. 10 illustrates a configuration to sustain the filter state using stored PES.

FIG. 10 shows a configuration of a system 1000 according to the present invention in which the PES is stored in a buffer

1001 during the most recent track-follow condition when all the feedback filters have become active and steady. The stored PES is used for sustaining the initial condition of the filter(s).

As shown, the system also includes a track-follow controller 1002 and a seek controller 1003, and a filter circuit 1004 configured in parallel and designed to provide an input to a summing circuit 1005 based on operation of various switches 1006, 1007, 1008, and 1009. It is noted that the fundamental harmonic component is exaggerated to illustrate the concept of the invention.

Switch A 1006 selects stored-PES or actual PES as input source to the filter circuit 1004. Switch-B 1007, Switch-C 1008 and Switch D-1009 allow following respective outputs to be added to the servo loop, filter 1004, seek controller 1003 or track-follow controller 1002.

The Stored-PES may originate from a single uninterrupted stream of PES over a given track during a long read or write operation that would take a full revolution of the spindle. It is noted that if a filter is mildly damped, it may not be necessary to have an input thereto.

Alternatively, the stored-PES may originate from several bursts of a short read/write operation conducted over various tracks on the corresponding platter (disk). Since the periodic disturbance components are more or less independent of the track number, the fine PES extracted from various tracks is expected to have phase and amplitude continuity of the corresponding error component buried in the time domain PES stream. When the frequency of an error source is an integer harmonic and the amplitude is steady for hundreds of revolutions, then averaging the fine PES over several tracks could produce a better representation of the error component. However, in practice (in the "real world") the amplitude may not be steady or the frequency and phase may drift and therefore averaging the PES to produce a stored PES is not recommended as a general rule.

Hence, by driving the feedback filter with the "Stored-PES" during the absence of a valid PES (e.g., such as during a seek) or when the PES is otherwise unavailable due to defect or the like, the filter state could be sustained. It is noted that, when multiple feedback filters are used, all of the filters must be driven by a single "Stored-PES" for the corresponding disk platter, and a required storage space for each filter state is replaced by a single "Stored-PES" buffer. This is a key advantage of the present invention.

Figure 11A:
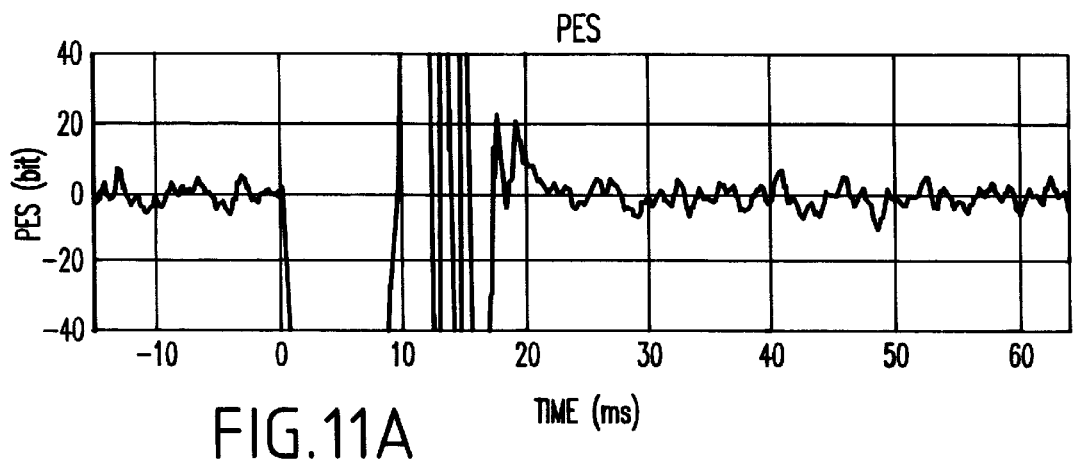
FIG. 11(a) illustrates a position error signal (PES)with filter state sustained by "stored-PES" during seek.
Figure 11B:
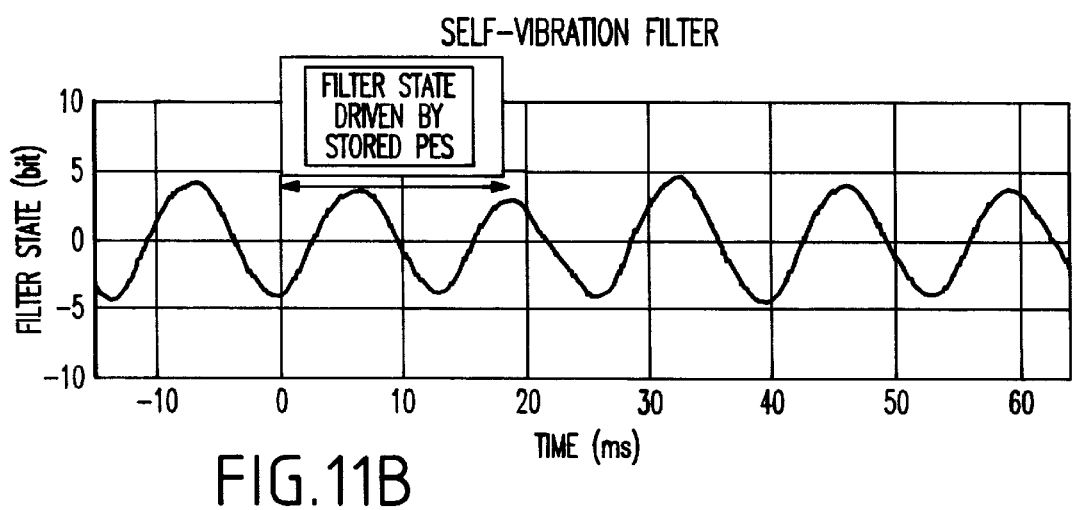
FIG. 11(b) illustrates a filter #1 state generated by "stored-PES" during seek.
Figure 11C:
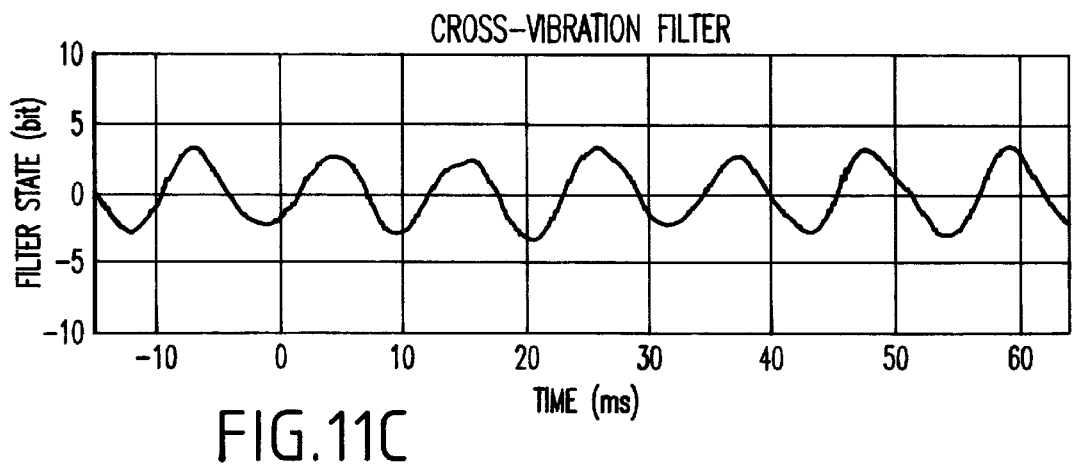
FIG. 11(c) illustrates a filter #2 state generated by "stored-PES" during seek.

FIGS. 11(a)–11(c) show the effect of driving the filter state by the "stored-PES" during a seek. That is, FIG, 11(a) illustrates the PES as a function of time, whereas FIGS. 11(b) and 11(c) illustrate the states of the self-vibration filter and the cross-vibration filter, respectively, being driven by the "stored-PES" over time. As shown, a smooth sinusoidal waveform results in both FIGS. 11(b) and 11(c).

The exemplary system of FIG. 10 (and as shown by the waveforms of FIGS. 11(b) and 11(c), has a single feedback filter configured in parallel to the basic track-following controller. It can be observed that the filter state for each filter continues to evolve without any significant glitch at a switching point to and from seek mode.

The corresponding PES history also remains optimum during the settle-out phase. The experimental tests validate that the filter state would not diverge undesirably in the absence of a true real time feedback activity, and a pseudo-PES signal represented by "stored-PES" is adequate to sustain the filter state without substantial distortion.

Under certain conditions, a method of sustaining the filter state can be simplified further. Through computational and experimental methods, it was found that a filter with about 20 to about 30 dB peak gain typically takes about three complete cycles to reach a near steady periodic output from its present output when a step change to its input signal is applied. This knowledge allows one to make a compromise. That is, where during a seek the feedback signal to the filter is not valid, the filter could continue to evolve with a null input (e.g., referred to as a "null-PES"), without losing the dynamic state value.

Whenever the seek lengths are of the order of a period corresponding to a significant disturbance source, one could anticipate the filter to maintain a reasonable phase and magnitude continuity of its state.

Therefore, if exact matching of the "would be" (expected) filter state at the moment of track-follow operation is not demanded, then the filter state is most simply sustained by allowing it to coast on its own during a seek, up until when the next valid PES stream is obtained.

Figure 12:
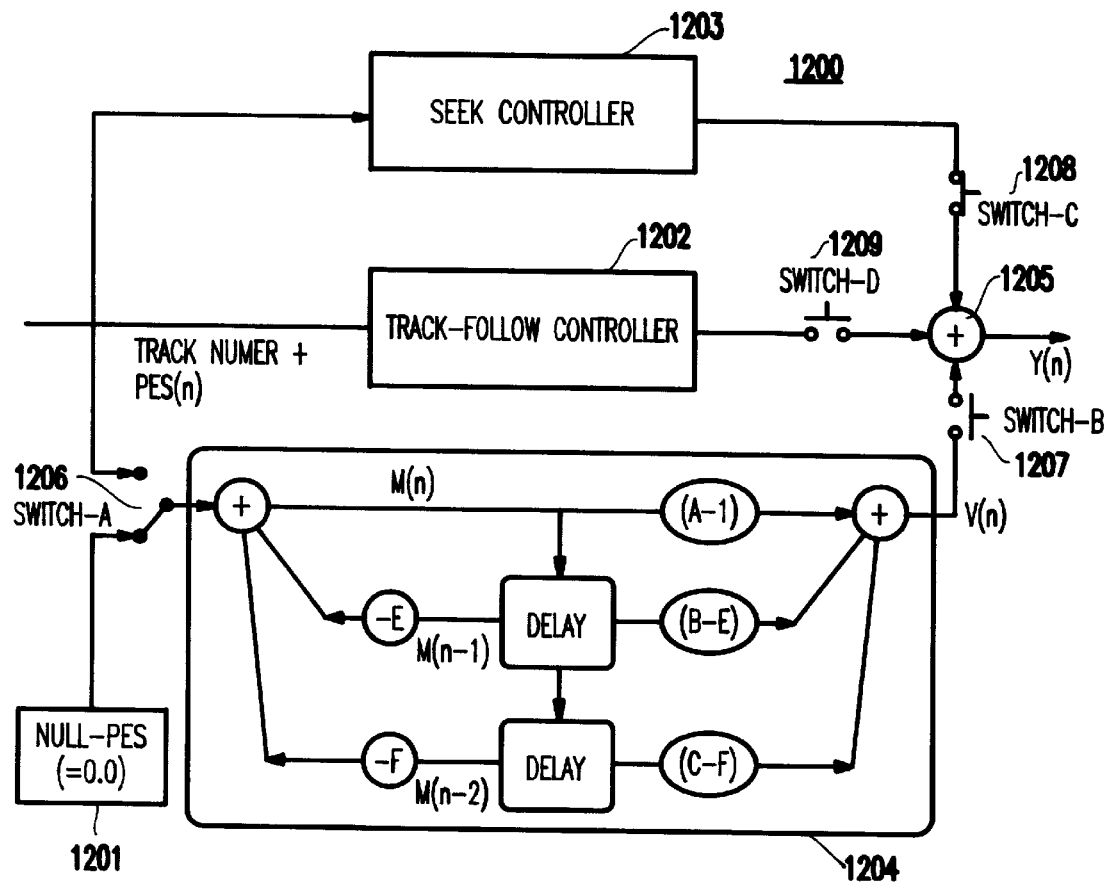
FIG. 12 illustrates a configuration to sustain filter state with a "null-PES" input during seek.

FIG. 12 illustrates a system 1200 for implementing the null-PES method. As shown, the system 1200 includes a null-PES storage 1201, track-follow controller 1202, a seek controller 1203, and a filter circuit 1204 configured in parallel and designed to provide an input to a summing circuit 1205 based on operation of various switches 1206, 1207, 1208, and 1209.

Switch A 1206 selects null-PES 1201 or actual PES as an input source to the filter circuit 1204. Switch-B 1207, Switch-C 1208 and Switch-D 1209 allow the following respective outputs to be added to the control loop: filter 1204, seek controller 1203 or track-follow controller 1202.

Figure 13A:
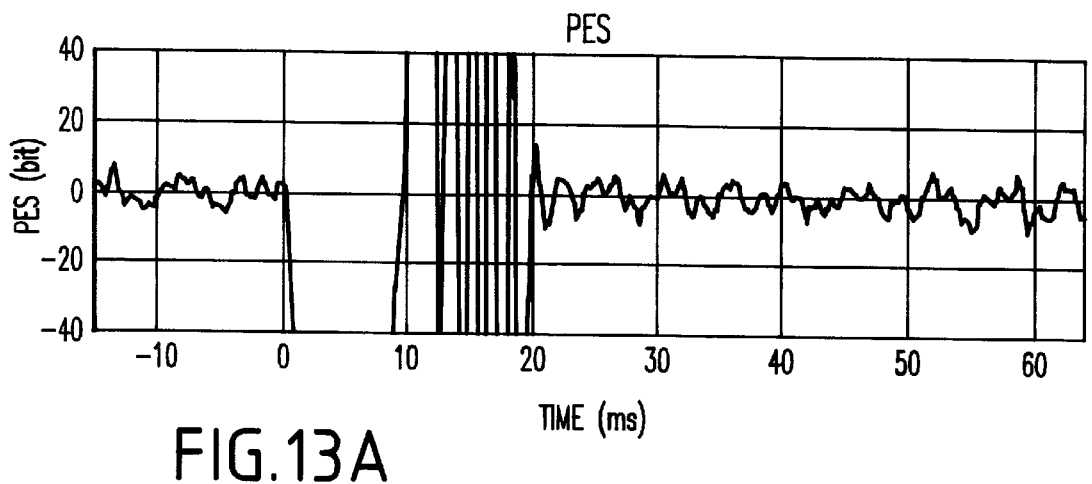
FIG. 13(a) illustrates a position error signal with filter state sustained by a "null-PES" during seek.
Figure 13B:
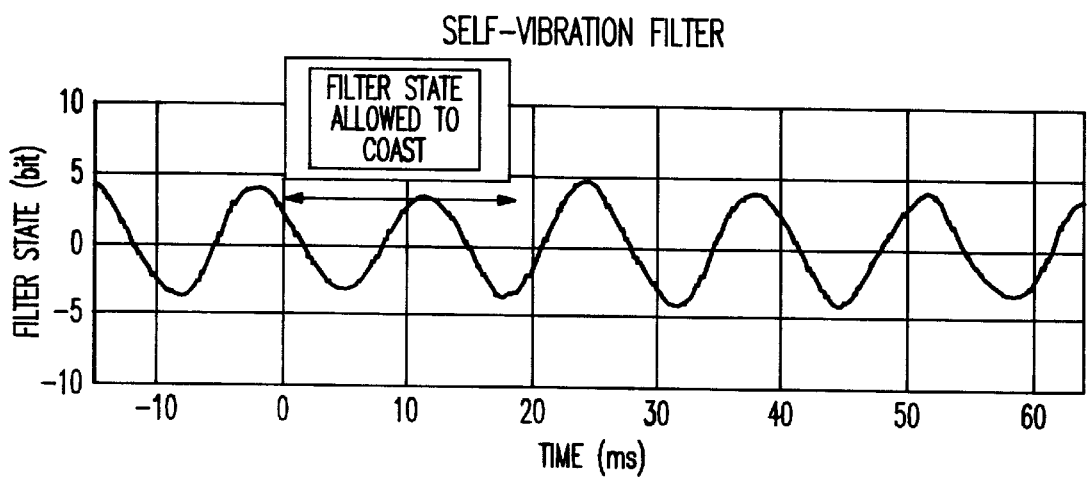
FIG. 13(b) illustrates a filter #1 state generated by a "null-PES" during a seek.
Figure 13C:
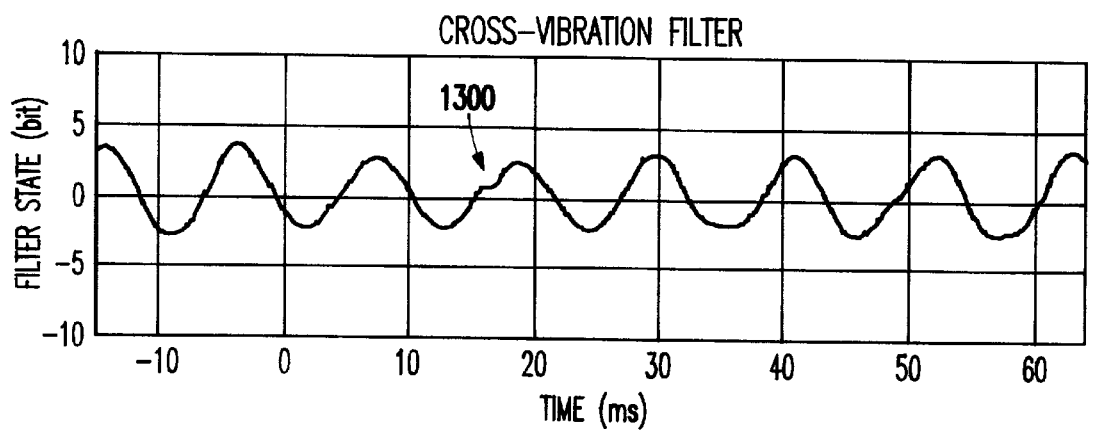
FIG. 13(c) illustrates a filter #2 state generated by a "null-PES" during a seek.

FIGS. 13(a)–13(c) show the corresponding results where the filter is allowed to coast during a seek while remaining disconnected.

FIG. 13(a) shows a still optimum settle-out PES trace, and FIG. 13(b) shows the Self-Vibration Filter #1 state with almost glitch-free continuity and a substantially smooth sinusoidal waveform.

FIG. 13(c) shows a mild hesitation at about 15 ms, labeled as 1300, of the cross vibration filter state during the seek to track-follow transition.

The Null-PES method can be enhanced further by reprogramming the respective filters with zero-damping property, while maintaining the same peak-frequency during the seek mode so that the state values are preserved with phase continuity without any amplitude decay. This may be an important consideration when handling disturbance components that are more than twice the fundamental frequency of the spindle speed (e.g., in the case of a disk-flutter servo).

Additionally, if a slow seek is desired for other performance reasons, then the time required to sustain the filter state may increase well about the period of the fundamental harmonic disturbance. In such case, a zero-damping filter to sustain the filter state may be desirable.

In configurations where the filter phase is preserved from an inner diameter to the outer diameter position of the actuator system, but the amplitude is expected to vary according to a known function, then the filter amplitude can be adjusted accordingly during a seek by having a series gain with each filter (e.g., illustrated in FIG. 15 and described below). In handling higher harmonic disk warpage-induced error, such an approach may become effective.

Thus, the feedback filter can either be configured in parallel or in series with the basic track-follow controller. For example, FIG. 14 and FIG. 15 respectively show the parallel and series realization with two filters as an example.

Figure 14:
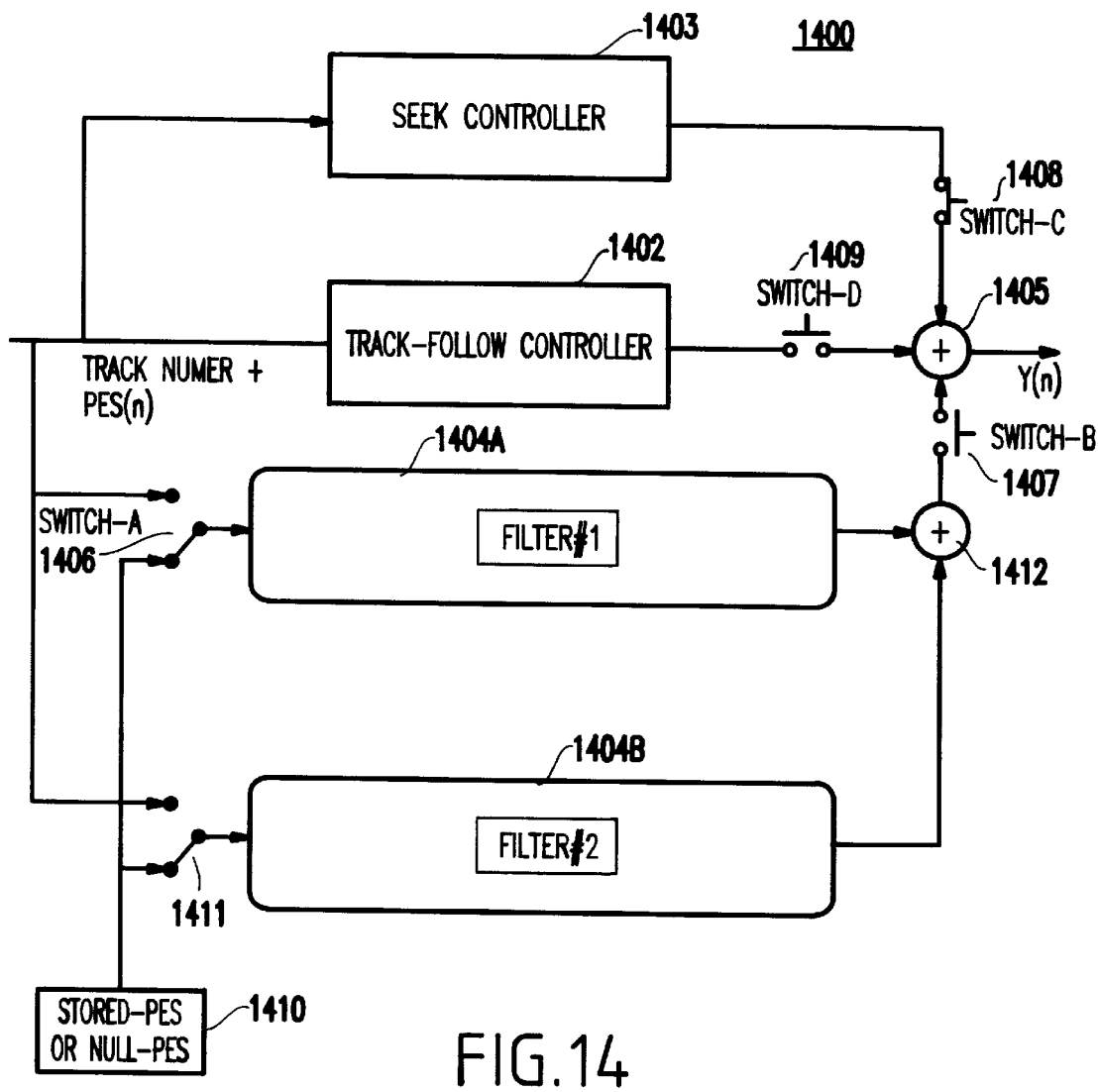
FIG. 14 illustrates a configuration to sustain multiple feedback filters in parallel mode.

The exemplary method described above to sustain the filter state according to the present invention corresponds to the system 1400 of FIG. 14 in which a parallel realization of the feedback filter is employed. As shown and as described above, the system includes a track-follow controller 1402, a seek controller 1403, and a plurality of filter circuits 1404A, 1404B configured in parallel and designed to provide an input to a summing circuit 1405 based on operation of various switches 1406, 1407, 1408, and 1409. Also included are the store-PES or Null-PES storage 1410, switch 1411, and a summing circuit 1412 for summing the outputs of the filters 1404A, 1404B. It is noted that a stored PES could be provided to Filter #1, whereas a null-PES could be provided to filter 2, depending upon the characteristics of the filter and disturbance.

Further, it is understood that when a feedback filter is configured in series to the basic track-follow controller, the similar concept of "stored-PES" or "null-PES" can be extended.

Figure 15:
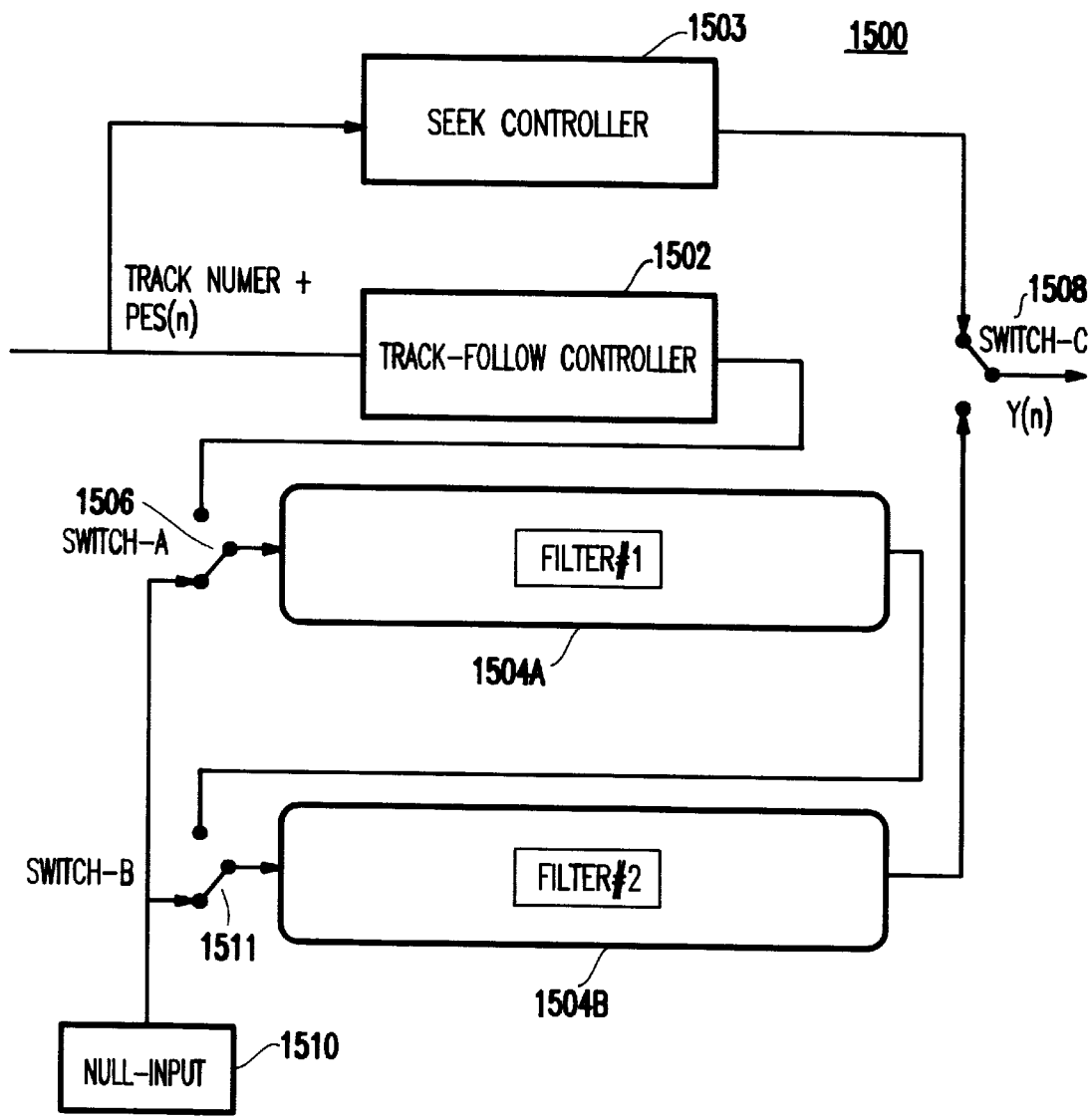
FIG. 15 illustrates a configuration to sustain multiple feedback filters in series mode.

For a series realization with "null-PES", the configuration is simple, as shown in the system 1500 of FIG. 15. However, when an equivalent of "stored-PES" is required, then the "stored-PES" buffer should be replaced by the stream of values representing the control input to a corresponding filter. As shown in FIG. 15, the system 1500 includes a track-follow controller 1502, a seek controller 1503, and a plurality of filter circuits 1504A, 1504B configured in parallel and designed to provide an input to a summing circuit 1505 based on operation of various switches 1506 and 1508. Also included are the Null-Input storage 1510 and switch 1511 for selectively coupling the null-input to the filter 1504B. There are no summing circuits.

Figure 16:
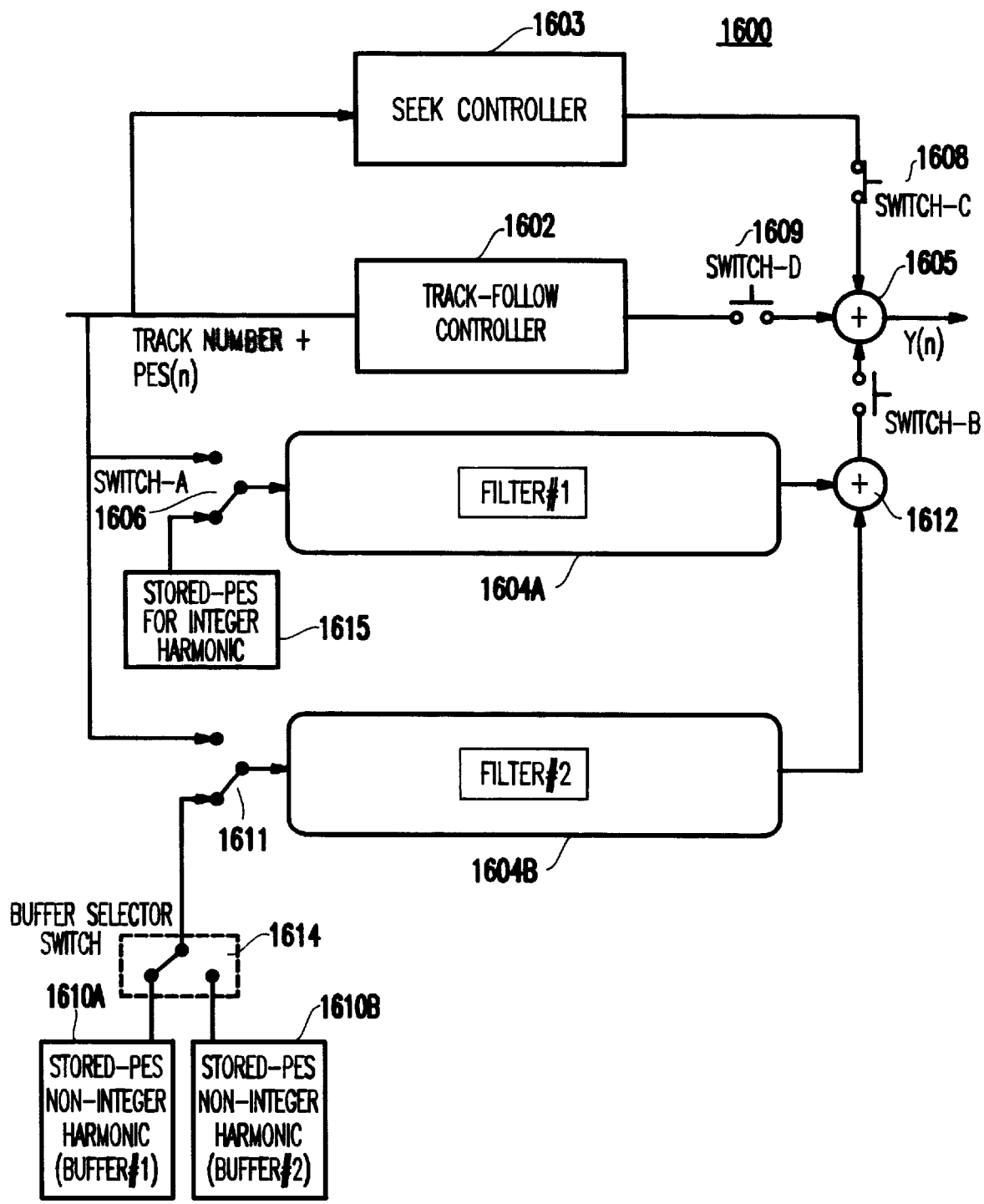
FIG. 16 illustrates a configuration to sustain filter states with stored-PES having a non-integer multiple of a basic harmonic component.
Figure 17A:
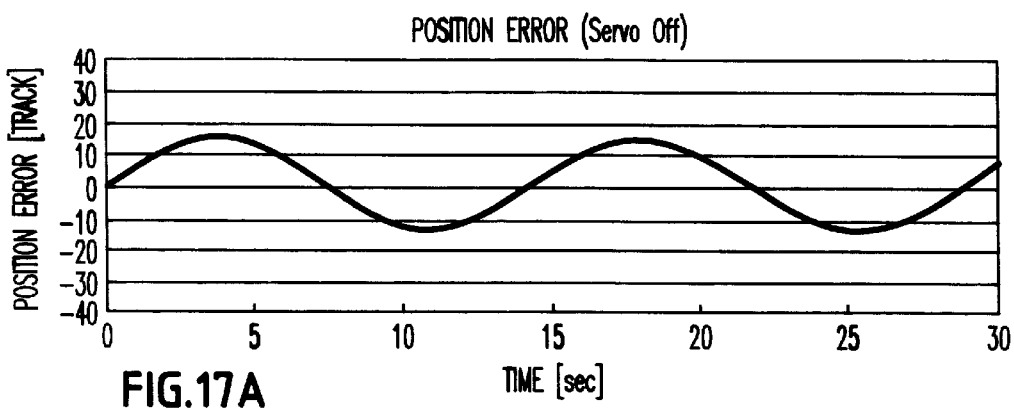
FIGS. 17(a)–17(d) illustrate another embodiment of the inventive method in which the filter output is maintained during a seek despite a switching of a first head read/write to a second head read/write.
Figure 17B:
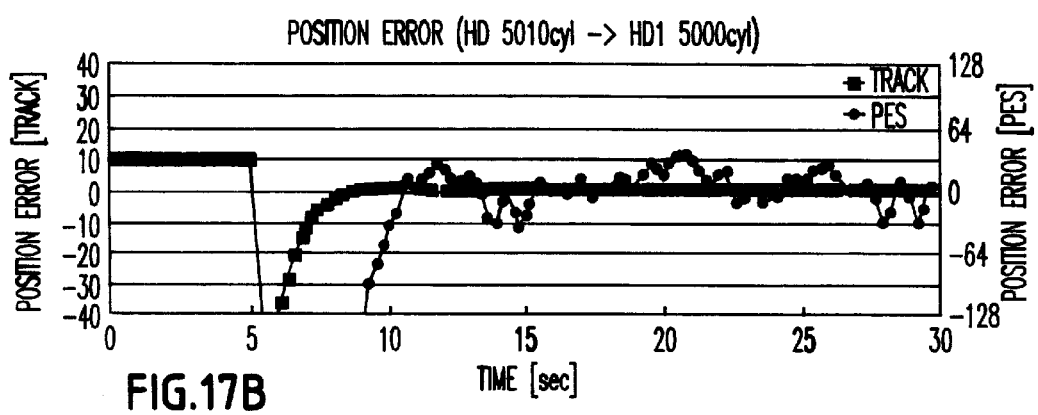
Figure 17C:
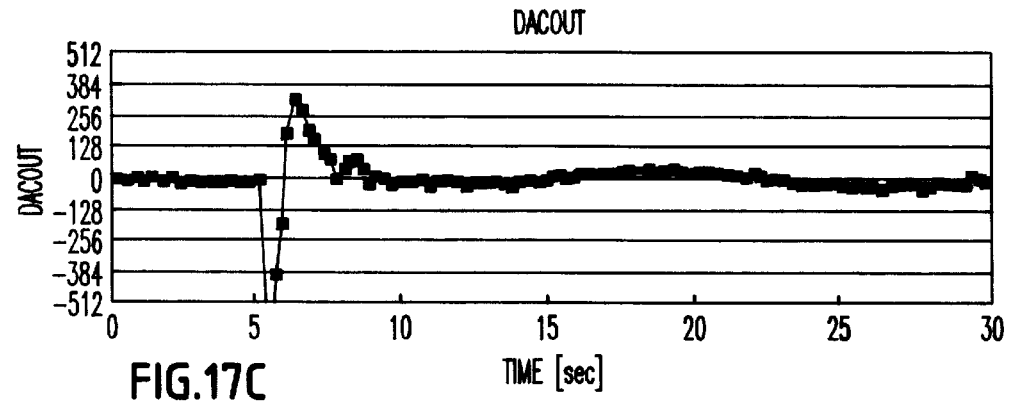
Figure 17D:
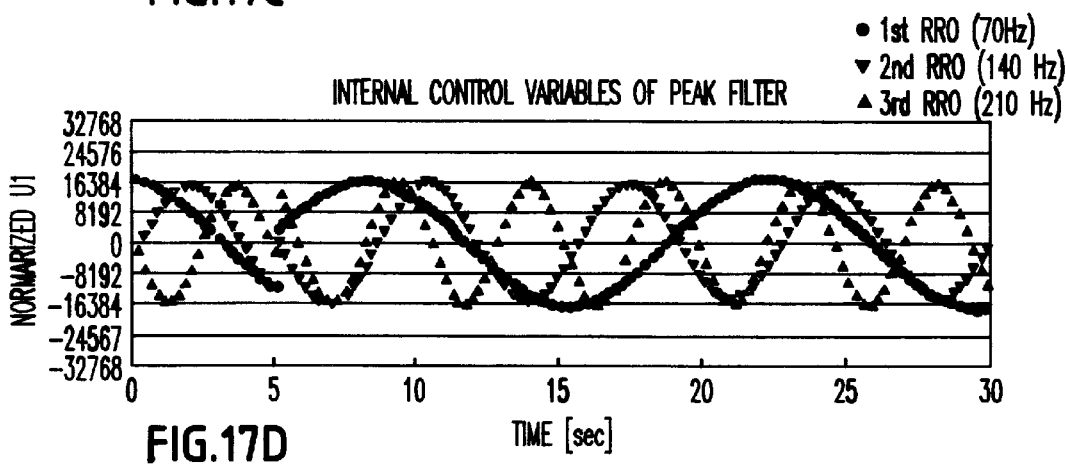

Finally, as shown in FIG. 16, a system 1600 is provided. As shown, the system includes a track-follow controller 1602, a seek controller 1603, and a plurality of filter circuits 1604A, 1604B configured in parallel and designed to provide an input to a summing circuit 1605 based on operation of various switches 1606, 1607, 1608, and 1609. Also included are a stored-PES Non-Integer Harmonic Buffers 1610A, 1610B, a Buffer Selector Switch 1614, a switch 1611, a second summing circuit 1612 for summing the outputs of the filters 1404A 1404B, and a stored-PES for Integer Harmonic storage 1615. This system is useful for when different devices are employed in single system and the devices create different harmonic disturbances.

With such a structure, when non-integer multiple of the fundamental harmonic signal must be solved using the method of the invention, then the "stored-PES" buffer concept must be extended to handle the address pointer and buffer refresh operations much more carefully. Because of the non-integer nature of the disturbance signal that is buried in the PES, the address pointer must be offset by one-period backwards in order to secure a phase continuous component.

While the first Stored-PES buffer 1610A is being used for the filter operation, the second buffer 1610B must be prepared to capture the most recent disturbance condition. The only restriction in filling the "stored-PES" buffers 1610A, 1610B is that the PES stream must be derived from an uninterrupted stream of PES data so that the non-integer cyclic disturbance condition is captured without discontinuity. The buffer selector switch 1614 is employed to maintain or refresh the stored-PES.

Preferably, a practical storage device uses a combination of each method based on the severity of the disturbance source. For example, a disk drive subject to strong self-vibration and mild cross-vibration should use "stored-PES" and "null-PES" to sustain the filter states, respectively, during a seek.

In the embodiments discussed above, the filter state can be preserved so long as the harmonic components that are servo-compensated are derived from the same head/disk combination. In products that are used in a single-user lap top environment, a majority of the read write operations are performed on a given head/disk pair, and therefore the continuity of the filter state is assured.

However, under certain configurations, rapid switching in a head/disk pair can be expected, such as the case in a multi-user server and array products. Regardless of the type of application when benchmark tests are performed on a disk drive, one particular test, referred to as "random seek", subjects the head/disk pair to be arbitrarily chosen for each seek operation. Therefore, the head switching will force the filter state to be non-continuous since each head/disk pair will have different levels of fundamental and higher harmonic components. In such a case, the filters have to be initialized at the end of a seek, as discussed in U.S. Pat. No. 5,608,586 each time a head is switched.

According to another embodiment of the present invention, such a problem is overcome. That is, as an enhancement, the filters could be activated at the beginning of a seek with a new initial condition from a stored table while the input to the filter is kept at null value as disclosed above. The output of the filter can be kept connected to the servo-loop. This method of initializing the filters ahead of time (e.g., in advance) provides a longer time period for head switch transients to die out (e.g., dissipate or settle-out) during the seek mode.

The above enhanced method can be implemented in a product microcode where at least one harmonic component (and topically a plurality of harmonic components) is servo-compensated with a corresponding number (e.g., topically a plurality such as two or three) of parallel filters with each peak frequency set at 70 Hz, 140 Hz and 210 Hz, respectively.

FIG. 17(*a*) shows the error signal due to a shifted disk have 15-track (0-pk) disk-shift.

FIG. 17(*b*) shows a 10-track seek to this new head/disk pair from another head/disk pair, and shows both the coarse track number and fine PES as a function of time.

FIG. 17(*c*) shows the actuator current commanded during this phase. "Dacout" is the control value presented to the current driver.

FIG. 17(*d*) is the key descriptive data that shows the effectiveness of the filter performance. It can be observed that, at the beginning of the seek, the three parallel filters are already setup to start functioning from a stored table value. Around 5 ms along the time axis, there is an abrupt jump in the filter state due to a new set of head/disk combination (e.g., a head switch). However, the filters continue to evolve without the benefit of a valid input signal during a seek. However, at the end of seek, the filters' PES is presented to the filters, and an accurate track following performance is observed in FIG. 17(*b*).

Thus, as shown in FIGS. 17(*a*)–17(*d*), in a switch from a first head to a second head, instead of switching to a head which has not been activated as in the conventional techniques, the second head has been earlier activated and the filter output has been maintained in an ON state during the seek. Thus, the problem of servo unlock conditions in which a few sectors may be missed, is overcome. That is, the invention is advantageous for the period of when the several sectors would by missed by moving the head during these several sector period when the valid PES is not available, and an accurate track-following can be achieved.

Since the head switch operation requires that the filters are initialized from a stored table, one of the advantages of continuous state operation where memory requirements are minimized is compromised. However, this limitation has been overcome in this implementation by compressing the filter state into a single normalized "sine" wave for a reference disk, and for all other remaining head/disk combinations the relative amplitude and phase of each sine wave is extracted and stored.

Therefore, only two parameters per head/disk combination per filter are required, instead of a complete wave form storage. One more compression is achieved by storing only a quarter sine wave since a full sine wave can be reconstructed using a quarter sine wave.

While the invention has been described in terms of several preferred embodiments, those skilled in the art will recognize that the invention can be practiced with modification within the spirit and scope of the appended claims.

What is claimed is:

1. A disk drive system, comprising:
    a head;
    a controller for controlling an operation of said head;
    at least one feedback filter coupled in relation to said controller; and
    a mechanism for keeping a function of said at least one feedback filter active during any of an absence of a valid position error signal (PES) and a position error signal being unavailable due to a defect during an operation of said head,
    wherein said mechanism provides a Null-PES input to said at least one feedback filter, during said operation, to allow said at least one feedback filter to coast along as in a track-following mode.

2. The system according to claim 1, wherein said operation includes a seek operation of said head.

3. The system according to claim 1, wherein a state of a same one of said at least one feedback filter continues to evolve based on the initial state value remaining just prior to said operation, and
    wherein at the end of said operation, the Null-PES input is replaced by a newly measured PES stream.

4. The system according to claim 1, wherein said at least one feedback-filter includes predetermined coefficients.

5. A disk drive system, comprising:
    a head;
    a controller for controlling an operation of said head;
    at least one feedback filter coupled in relation to said controller; and
    a mechanism for keeping a function of said at least one feedback filter active during any of an absence of a valid position error signal (PES) and a position error signal being unavailable due to a defect during an operation of said head,
    wherein said at least one feedback filter includes a filter with identical peak-frequency, and with zero damping so that a filter state evolution is sustained without any substantial dissipation of a filter sinusoidal amplitude while preserving the amplitude during said operation.

6. A disk drive system, comprising:
    a head;
    a controller for controlling an operation of said head;
    at least one feedback filter coupled in relation to said controller;
    a mechanism for keeping a function of said at least one feedback filter active during any of an absence of a valid position error signal (PES) and a position error signal being unavailable due to a defect during an operation of said head; and
    a dedicated PES memory buffer operatively coupled to said at least one feedback filter, a pseudo-PES stream being extracted and input to said at least one feedback filter such that a state of said at least one feedback filter is sustained during said operation.

7. The system according to claim 6, wherein at the end of said operation, an input to said at least one feedback filter is replaced by a newly measured PES stream, and
    wherein said PES memory buffer is continuously refreshed, while said head is in a track-follow mode, with a most recent PES stream, as indexed by a sector number of a disk regardless of a track number of the disk.

8. The system according to claim 7, wherein said memory buffer retains the most recent disturbance characteristics of said drive.

9. The system according to claim 8, further comprising a spindle for rotating the disk,
    wherein when a disturbance frequency is substantially an integer multiple of a rotating speed of the spindle, a length of the PES memory buffer is exactly equal to a total number of servo sectors in a track of said disk.

10. The system according to claim 9, wherein if the disturbance frequency is lower than that of the spindle speed, the length of the PES memory buffer is extended to cover a complete cycle of a slowest frequency of interest.

11. The system according to claim 10, wherein individualized address pointers are allocated for each disturbance component that corresponds to a non-integer multiple of the spindle rotating speed,
    said address pointers being offset by a number that is computed to be a function of its period.

12. A disk drive system, comprising:
    a head;
    a controller for controlling an operation of said head;
    at least one feedback filter coupled in relation to said controller; and
    a mechanism for keeping a function of said at least one feedback filter active during any of an absence of a valid position error signal (PES) and a position error signal being unavailable due to a defect during an operation of said head,
    wherein one of a stored-PES and a null-PES is provided to said at least one feedback filter.

13. The system according to claim 12, wherein the Stored-Pes buffer is refreshed when a red or a write operation by said occurs.

14. A disk drive system, comprising:
    a head;
    a controller for controlling an operation of said head;
    at least one feedback filter coupled in relation to said controller; and
    a mechanism for keeping a function of said at least one feedback filter active during any of an absence of a valid position error signal (PES) and a position error signal being unavailable due to a defect during an operation of said head,
    wherein a transition from a damped to an undamped characteristic of said at least one filter is performed to maintain an amplitude of said PES with phase continuity.

15. A disk drive system, comprising:
a head;
a controller for controlling an operation of said head;
at least one feedback filter coupled in relation to said controller; and
a mechanism for keeping a function of said at least one feedback filter active during any of an absence of a valid position error signal (PES) and a position error signal being unavailable due to a defect during an operation of said head,
wherein said controller comprises a track-follow controller, and
wherein said at least one feedback filter comprises a second filter coupled in parallel to said track-follow controller.

16. A disk drive system, comprising:
a head;
a controller for controlling an operation of said head;
at least one feedback filter coupled in relation to said controller; and
a mechanism for keeping a function of said at least one feedback filter active during any of an absence of a valid position error signal (PES) and a position error signal being unavailable due to a defect during an operation of said head,
wherein said mechanism comprises first and second buffers for processing a non-integer multiple of a fundamental harmonic frequency.

17. A disk drive system, comprising:
a head;
a controller for controlling an operation of said head;
at least one feedback filter coupled in relation to said controller;
a mechanism for keeping a function of said at least one feedback filter active during any of an absence of a valid position error signal (PES) and a position error signal being unavailable due to a defect during an operation of said head;
an actuator coupled to said head; and
a gain adjustor coupled to said at least one feedback filter, such that when said at least one feedback filter has a predetermined phase and an amplitude changes with a radial location of an actuator, said gain adjustor adjusts a gain.

18. A method of sustaining a filter state in a disk drive system including a head, comprising:
activating a feedback filter of the disk drive system;
storing a position error signal (PES) associated with said head with said filter activated; and
disconnecting said filter during a predetermined operation but maintaining an activation of said filter such that a filter state computation is continued during said predetermined operation, such that said filter state computation is sustained using one of a stored position error signal (PES) and a Null PES signal.

19. The method according to claim 18, further comprising:
storing the PES only for a full period of a disturbance cycle, a filter state history not being stored for initialization.

20. The method according to claim 18, further comprising:
connecting said filter during a read or write operation by said head; and
refreshing the stored PES in a stored PES buffer.

21. The method of claim 18, wherein with said Null-PES input provided to said feedback filter, during said operation, said feedback filter is allowed to coast along as in a track-following mode.

22. A disk drive system, comprising:
a first drive generating a first frequency self-vibration component;
a second drive generating a second frequency periodic vibration component that impacts a position error signal (PES) of the first drive; and
first and second feedback filters configured at the first and second frequencies and respectively coupled to receive outputs from said first and second drive, such that a state of said first and second filters is maintained during a predetermined operation of said drive system.

23. The disk drive system according to claim 22, wherein said disk drive is for being housed in a computer chassis and for use with a spindle, a disk for being rotated by said spindle, and a head for reading and writing to said disk, and
wherein said first drive is located in a first portion of a computer chassis, said first drive generating a first frequency self-vibration component generated by spindle imbalance.

24. The disk drive system according to claim 22, wherein during a track-follow mode, the filter states are active and then the filters are disconnected from a feedback loop during a seek operation,
wherein as the disk drive system enters the track-follow mode subsequent to the seek operation, the filters are activated with a zero initial condition.

25. The disk drive system according to claim 22, wherein a state of the first and second filters is initialized from a stored filter state.

26. The disk drive system according to claim 25, wherein said first and second filters are driven by one of a previously stored PES and a null PES during absence of a valid PES so as to sustain a filter state thereof.

27. The disk drive system according to claim 26, wherein said first and second filters are driven by a single stored-PES for a corresponding disk platter.

28. The disk drive system according to claim 22, wherein when a feedback signal to the first and second filters is not valid, the first and second filters are provided with a null input.

29. The disk drive system according to claim 22, wherein when a feedback signal to the first and second filters is not valid, a state of said filters is allowed to coast, up until when a next valid PES stream is obtained.

30. The disk drive system according to claim 22, wherein said first and second filters have zero-damped property, while maintaining a same peak-frequency, so that filter state values are preserved with phase continuity without any amplitude decay.

31. The disk drive system according to claim 22, further comprising an actuator system coupled to said first and second drives,
wherein a filter phase is preserved from an inner diameter to an outer diameter position of the actuator system, the filter amplitude is selectively adjusted during a seek by having a series gain with each filter.

32. The disk drive system according to claim 22, further comprising a track-follow controller coupled to said first and second filters, wherein said first and second filters are coupled one of in parallel and in series with the track-follow controller.

33. The disk drive system according to claim 32, further comprising a Null-input storage and a switch for selectively coupling the null-input to at least one of the first and second filters.

34. The disk drive system according to claim 22, further comprising:

first and second stored-PES non-integer harmonic buffers;

a buffer selector switch for selectively providing said stored PES to any of said first and second filters; and a stored-PES integer harmonic storage for being selectively provided to any of said first and second filters, wherein when a non-integer multiple of the fundamental harmonic signal is present, and a first Stored-PES buffer is being used for the filter operation, the second buffer captures a most recent disturbance condition.

* * * * *